(12) United States Patent
Shamishidov et al.

(10) Patent No.: US 7,578,728 B2
(45) Date of Patent: Aug. 25, 2009

(54) LAPPING SYSTEM HAVING A POLYMERIC LAPPING TOOL

(75) Inventors: Boris Shamishidov, Kiryat Chaim (IL); Alexander Ignatovsky, Haifa (IL)

(73) Assignee: Fricso Ltd., Tirat Hakarmel (IL)

( * ) Notice: Subject to any disclaimer, the term of this patent is extended or adjusted under 35 U.S.C. 154(b) by 0 days.

(21) Appl. No.: 11/538,443

(22) Filed: Oct. 4, 2006

(65) Prior Publication Data
US 2007/0135023 A1    Jun. 14, 2007

Related U.S. Application Data

(63) Continuation-in-part of application No. 10/655,312, filed on Sep. 5, 2003, now Pat. No. 7,134,939.

(51) Int. Cl.
*B24B 7/00* (2006.01)
(52) U.S. Cl. .................. 451/111; 451/526; 451/259
(58) Field of Classification Search ............ 451/111, 451/526
See application file for complete search history.

(56) References Cited

U.S. PATENT DOCUMENTS

| | | | | |
|---|---|---|---|---|
| 4,125,637 A | * | 11/1978 | Tanner | 427/198 |
| 5,433,531 A | * | 7/1995 | Thompson | 384/276 |
| 5,591,068 A | * | 1/1997 | Taylor | 451/104 |
| 6,375,545 B1 | * | 4/2002 | Yano et al. | 451/36 |
| 6,439,968 B1 | * | 8/2002 | Obeng | 451/41 |
| 7,134,939 B2 | * | 11/2006 | Shamshidov et al. | 451/36 |
| 2003/0217517 A1 | * | 11/2003 | Allison et al. | 51/298 |
| 2008/0166955 A1 | * | 7/2008 | Mandel et al. | 451/164 |

OTHER PUBLICATIONS

"Introduction to Polyurethane", Swan Manufacturing.*
"Hardness and Resilience of Polyurethane", Griffith Polymerns, Inc.*
"Tungsten", Wikipedia.*
U.S. Appl. No. 11/651,480.*

* cited by examiner

*Primary Examiner*—Maurina Rachuba
(74) *Attorney, Agent, or Firm*—Mark M. Friedman

(57) ABSTRACT

A lapping system including: (a) a workpiece having a metal working surface; (b) a lapping tool having a contact surface for disposing generally opposite the working surface, the contact surface including an organic, polymeric material; (c) a plurality of abrasive particles for disposing between the contact surface and the working surface, and (d) a mechanism, associated with the working and contact surfaces, for applying a relative motion between the surfaces, and for exerting a load on the contact surface and the working surface, the contact surface for providing an at least partially elastic interaction with the plurality of abrasive particles, and wherein the contact surface and the mechanism are designed and configured, and the plurality of particles is selected, such that upon activation of the mechanism, the relative motion under the load effects lapping of the metal working surface to produce a tribological surface.

24 Claims, 22 Drawing Sheets

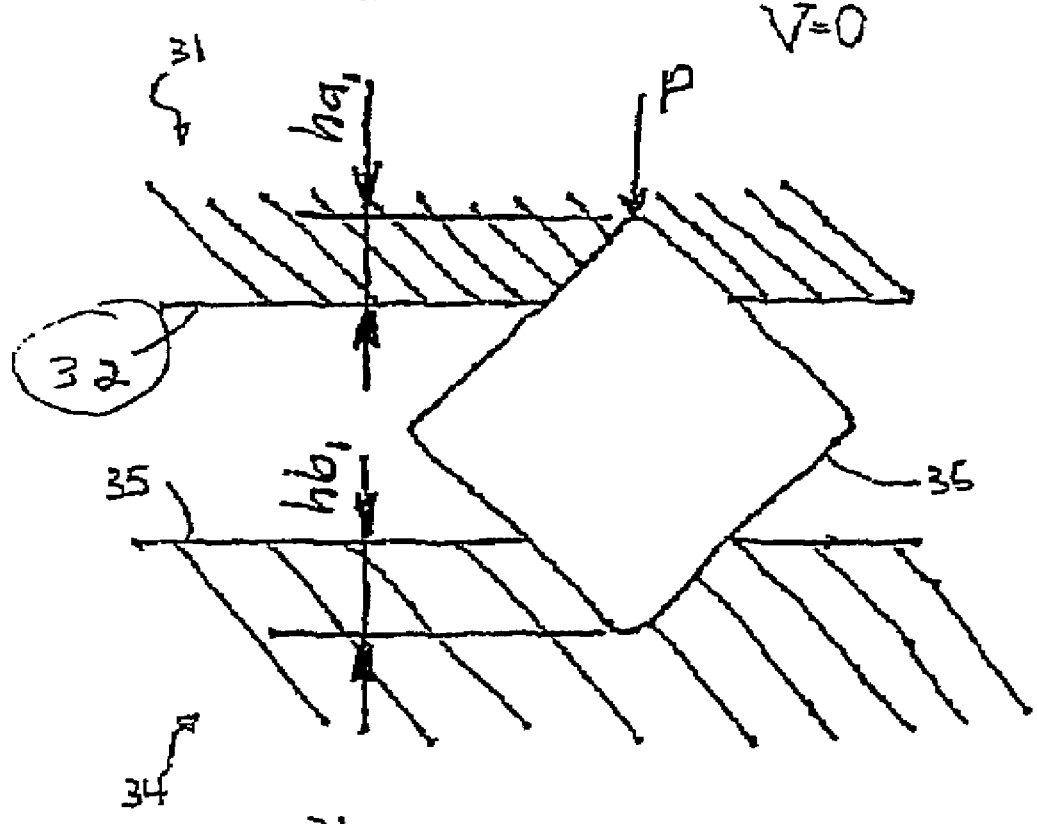
FIG. 1C (i) PRIOR ART
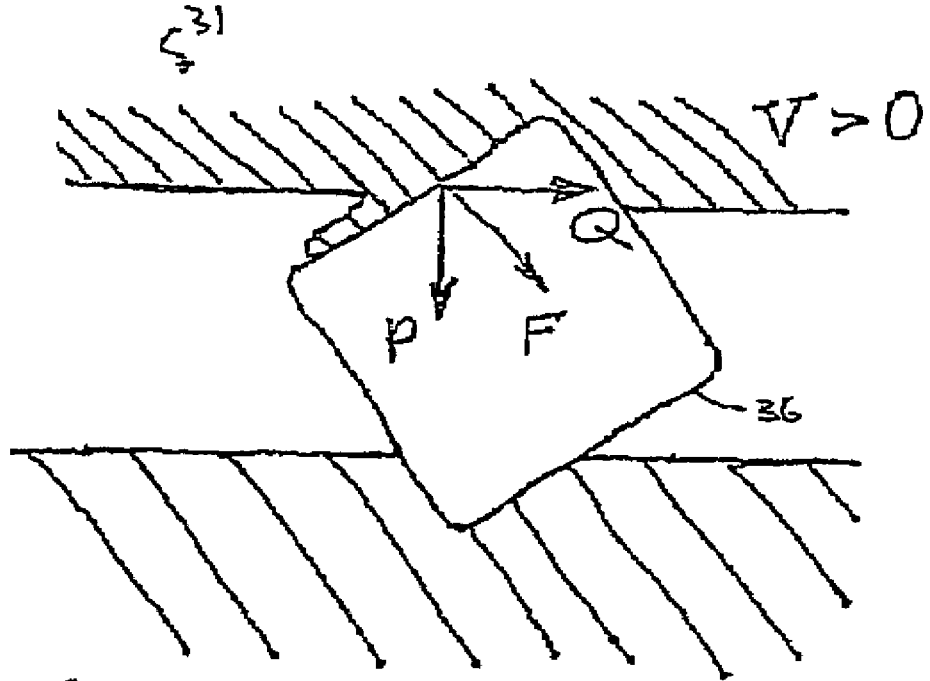
FIG. 1C (ii) PRIOR ART

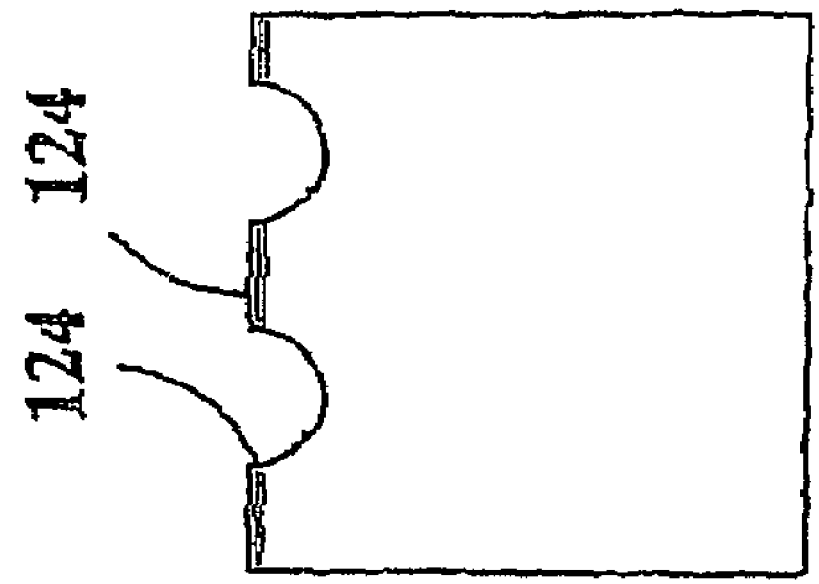
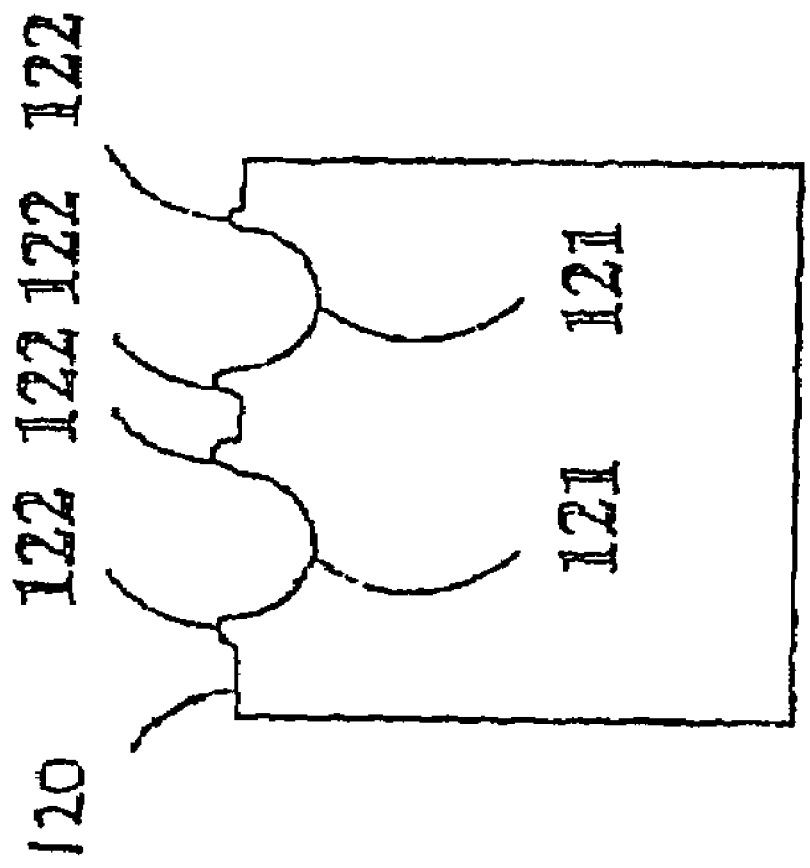

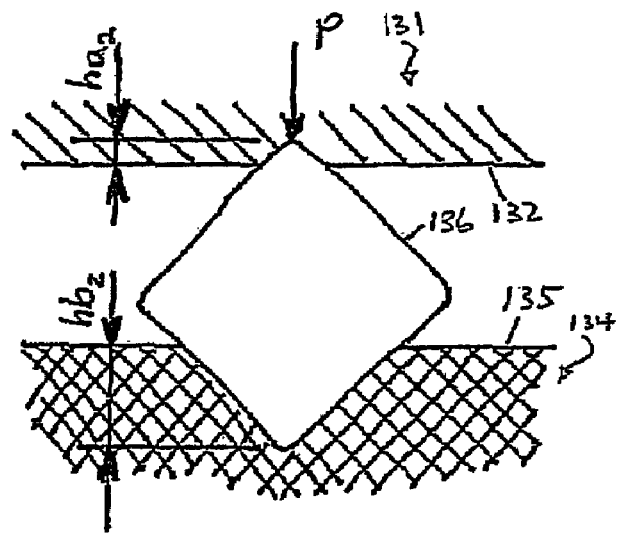
FIG. 9C(i)
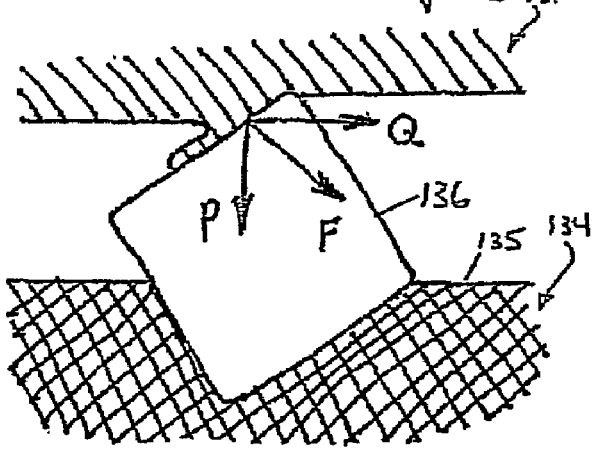
FIG. 9C(ii)
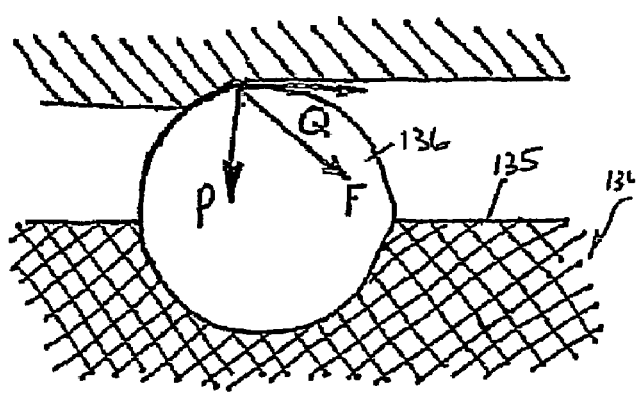
FIG. 9C(iii)

LAPPING SYSTEM HAVING A POLYMERIC LAPPING TOOL

This application is a Continuation In Part of PCT Application No. IL/05/000284, filed Mar. 10, 2005, and a Continuation In Part of U.S. patent application Ser. No. 10/655,312, filed Sep. 5, 2003 now U.S. Pat. No. 7,134,939.

FIELD AND BACKGROUND OF THE INVENTION

The present invention relates to lapping systems for producing tribological surfaces, and, more particularly, to a lapping system having a polymeric lapping tool surface.

In order to reduce friction and wear in mechanically interacting surfaces, a lubricant is introduced to the zone of interaction. As depicted schematically in FIG. 1A, opposing surfaces 32 and 34 move at a relative velocity V. Under ideal lubricating conditions, a lubricant film 20 between these surfaces forms an intact layer that permits the moving surfaces to interact with the lubricant. Under such conditions, no contact between surfaces 32 and 34 occurs at all, and the lubricant layer is said to carry a load P that exists between the opposing surfaces. If the supply of lubricant is insufficient, a reduction in the effectively of the lubrication ensues, which allows surface-to-surface interactions to occur.

As shown schematically in FIG. 1B, below a certain level of lubricant supply, the distance between opposing, relatively moving surfaces 32 and 34 diminishes because of load P, such that surface asperities, i.e., peaks of surface material protruding from the surfaces, may interact. Thus, for example, an asperity 36 of surface 34 can physically contact and interact with an asperity 38 of surface 32. In an extreme condition, the asperities of surfaces 32 and 34 carry all of the load existing between the interacting surfaces. In this condition, often referred to as boundary lubrication, the lubricant is ineffective and the friction and wear are high.

Grinding and lapping are conventional methods of improving surface roughness and for producing working surfaces for, inter alia, various tribological applications. FIG. 1C (i)-(ii) schematically illustrate a working surface being conditioned in a conventional lapping process. In FIG. 1C(i), a working surface 32 of a workpiece 31 faces a contact surface 35 of lapping tool 34. An abrasive paste containing abrasive particles, of which is illustrated a typical abrasive particle 36, is disposed between working surface 32 and contact surface 35. Contact surface 35 of lapping tool 34 is made of a material having a lower hardness with respect to working surface 32. The composition and size distribution of the abrasive particles are selected so as to readily wear down working surface 32 according to plan, such as reducing surface roughness so as to achieve a pre-determined finish.

A load is exerted in a substantially normal direction to surfaces 32 and 35, causing abrasive particle 36 to penetrate working surface 32 and contact surface 35, and resulting in a pressure P being exerted on a section of abrasive particle 36 that is embedded in working surface 32. The penetration depth of abrasive particle 36 into working surface 32 is designated by $h_{a1}$; the penetration depth of abrasive particle 36 into contact surface 35 is designated by $h_{b1}$. Generally, abrasive particle 36 penetrates into lapping tool 34 to a greater extent than the penetration into workpiece 31, such that $h_{b1} \gg h_{a1}$.

In FIG. 1C(ii), workpiece 31 and lapping tool 34 are made to move in a relative velocity V. The pressure P, and relative velocity V of workpiece 31 and lapping tool 34, are of a magnitude such that abrasive particle 36, acting like a knife, gouges out a clip of surface material from workpiece 31.

At low relative velocities, abrasive particle 36 is substantially stationary. Typically, however, and as shown in FIG. 1C(ii), relative velocity V is selected such that a corresponding shear force Q is large. Because the material of lapping tool 34 that is in contact with abrasive particle 36 is substantially unyielding (i.e., of low elasticity) with respect to the particles in the abrasive paste, these particles are usually ground up quite quickly, such that the abrasive paste must be replenished frequently.

In the known art, grinding, lapping, polishing and cutting are carried out on materials such as metals, ceramics, glass, plastic, wood and the like, using bonded abrasives such as grinding wheels, coated abrasives, loose abrasives and abrasive cutting tools. Abrasive particles, the cutting tools of the abrasive process, are naturally occurring or synthetic materials which are generally much harder than the materials which they cut. The most commonly used abrasives in bonded, coated and loose abrasive applications are garnet, alpha alumina, silicon carbide, boron carbide, cubic boron nitride, and diamond. The relative hardness of the materials can be seen from Table 1:

TABLE 1

| Material | Knoop Hardness Number |
| --- | --- |
| garnet | 1360 |
| alpha-alumina | 2100 |
| silicon carbide | 2480 |
| boron carbide | 2750 |
| cubic boron nitride | 4500 |
| diamond (monocrystalline) | 7000 |

The choice of abrasive is normally dictated by economics, finish desired, and the material being abraded. The above-provided list of abrasive materials is in order of increasing hardness, but is also, coincidentally, in order of increasing cost, with garnet being the least expensive abrasive material and diamond the most expensive.

Generally, a soft abrasive is selected to abrade a soft material and a hard abrasive to abrade harder types of materials in view of the cost of the various abrasive materials. There are, of course, exceptions such as very gummy materials where the harder materials actually cut more efficiently. Furthermore, the harder the abrasive grain, the more material it will remove per unit volume or weight of abrasive. Super-abrasive materials include diamond and cubic boron nitride, both of which are used in a wide variety of applications.

The known lapping methods and systems have several distinct deficiencies, including:

The contact surface of the lapping tool is eventually consumed by the abrasive material, requiring replacement. In some typical applications, the contact surface of the lapping tool is replaced after approximately 50 workpieces have been processed.

The lapping processing must generally be performed in several discrete lapping stages, each stage using an abrasive paste having different physical properties.

Sensitivity to the properties of the abrasive paste, including paste formulation, hardness of the abrasive particles, and particle size distribution (PSD) of the abrasive particles.

Sensitivity to various processing parameters in the lapping process.

There is therefore a recognized need for, and it would be highly advantageous to have, a lapping system that overcomes the manifest deficiencies of the known lapping technologies. It would be of further advantage to have a lapping system that produces working surfaces having improved tribological properties.

SUMMARY OF THE INVENTION

One aspect of the present invention is a lapping system having a polymeric lapping tool surface, for producing metal work surfaces having greatly improved tribological properties. The lapping system includes: (a) a workpiece having the metal working surface; (b) a lapping tool having a contact surface, the contact surface for disposing generally opposite the working surface, tho contact surface including an organic, polymeric material; (c) a plurality of abrasive particles, the abrasive particles for disposing between the contact surface and the working surface, and (d) a mechanism, associated with at least one of the working surface and the contact surface, for applying a relative motion between the contact surface and the metal working surface, and for exerting a load on the contact surface and the working surface, the contact surface for providing an at least partially elastic interaction with the plurality of abrasive particles, and wherein the contact surface and the mechanism are designed and configured, and the plurality of particles is selected, such that upon activation of the mechanism, the relative motion under the load effects lapping of the metal working surface to produce the tribological surface.

According to another aspect of the present invention there is provided a mechanical system for lapping a metal working surface to produce a tribological surface, the system including: (a) a workpiece having the metal working surface; (b) a lapping tool having a contact surface, the contact surface for disposing generally opposite the working surface, the contact surface including an organic, polymeric material; (c) a plurality of abrasive particles, the abrasive particles for disposing between the contact surface and the working surface, and (d) a mechanism, associated with at least one of the working surface and the contact surface, for applying a relative motion between the contact surface and the metal working surface, and for exerting a load on the contact surface and the working surface, the contact surface for providing an at least partially elastic interaction with the plurality of abrasive particles, and wherein the contact surface and the mechanism are designed and configured, such that upon activation of the mechanism, the load is exerted on the contact surface and the working surface, such that at least a portion of the abrasive particles are simultaneously in contact with the contact surface and with the working surface.

According to further features in the described preferred embodiments, the mechanism is adapted to exert the load on the contact surface and the working surface, such that at least a portion of the abrasive particles are simultaneously in contact with the contact surface and with the working surface.

According to still further features in the described preferred embodiments, the polymeric material and the abrasive particles are selected, and the mechanism is adapted, so as to effect an at least partially elastic interaction between the contact surface and the abrasive particles, such that at least a portion of the abrasive particles cut into the working surface.

According to still further features in the described preferred embodiments, the contact surface has a Shore D hardness within a range of 40-90.

According to still further features in the described preferred embodiments, the Shore D hardness is within a range of 60-90.

According to still further features in the described preferred embodiments, the Shore D hardness is within a range of 65-90, and wherein the impact resistance is within a range of 4-20 $kJ/m^2$.

According to still further features in the described preferred embodiments, the Shore D hardness is within a range of 68-82.

According to still further features in the described preferred embodiments, the Shore D hardness is within a range of 68-82, and wherein the impact resistance is within a range of 5-8 $kJ/m^2$.

According to still further features in the described preferred embodiments, the abrasive particles are freely disposed between the contact surface and the working surface.

According to still further features in the described preferred embodiments, the polymeric material includes an epoxy material.

According to still further features in the described preferred embodiments, the polymeric material includes a polyurethane.

According to still further features in the described preferred embodiments, the polymeric material includes an epoxy material.

According to still further features in the described preferred embodiments, the composition of the epoxy material and the polyurethane has a weight ratio of 25:75 to 90:10.

According to still further features in the described preferred embodiments, the composition of the contact surface includes the polyurethane in a range of 3% to 75%, by weight.

According to still further features in the described preferred embodiments, the metal working surface is a steel working surface.

According to still further features in the described preferred embodiments, the metal working surface has a Rockwell C hardness of at least 20.

According to still further features in the described preferred embodiments, the metal working surface has a Rockwell C hardness of at least 50.

According to still further features in the described preferred embodiments, the mechanical system further includes an abrasive paste including the abrasive particles.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 1C(i)-(ii) schematically illustrate a working surface being conditioned in a conventional lapping process;

FIG. 8A is a cross-sectional schematic description of the working surface, after micro-grooving, the micro-grooves being surrounded by bulges;

FIG. 8B is a cross-sectional schematic description of the surface of FIG. 8A, after undergoing the inventive lapping process;

FIG. 9C(i)-(iii) are an additional cross-sectional schematic representation of a working surface being conditioned in the inventive lapping process;

FIG. 10A-1 and FIG. 10A-2 are photographic representations of wetting patterns of a reference working surface that was initially covered with oil, wherein FIG. 10A-1 represents the prior-art working surface 5 seconds after an oil drop was distributed, and FIG. 10A1-2 represents the identical working surface, 60 seconds after the oil drop was distributed;

FIG. 10B-1 and FIG. 10B-2 are photographic representations of wetting patterns of an exemplary inventive working surface that was initially covered with oil, wherein FIG. 10B-1 represents the inventive working surface 5 seconds after an oil drop was distributed, and FIG. 10B1-2 represents the identical work surface, 60 seconds after the oil drop was distributed;

FIG. 12A is a schematic, cross-sectional diagram showing a solid, carbon-containing film deposited on a working surface, according to the present invention;

DESCRIPTION OF THE PREFERRED EMBODIMENTS

Figure 1A:
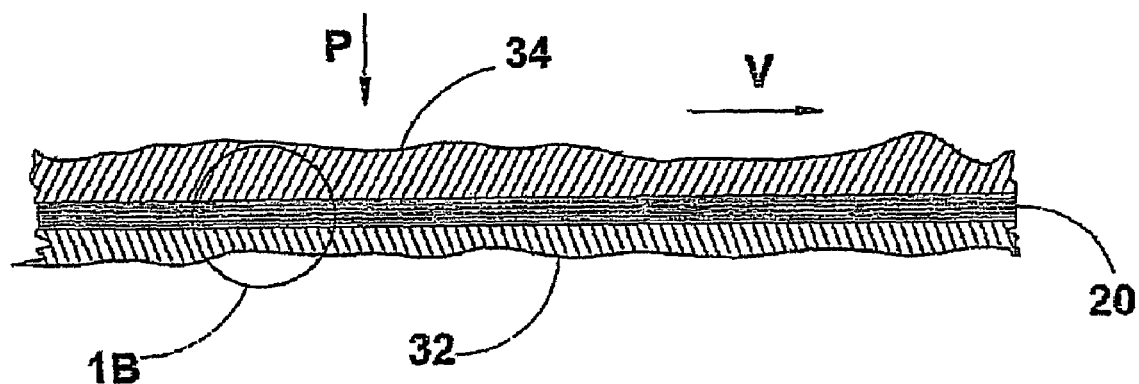
FIG. 1A is a schematic description of the mechanically interacting surfaces having an interposed lubricating layer.

The principles and operation of the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

Figure 2:
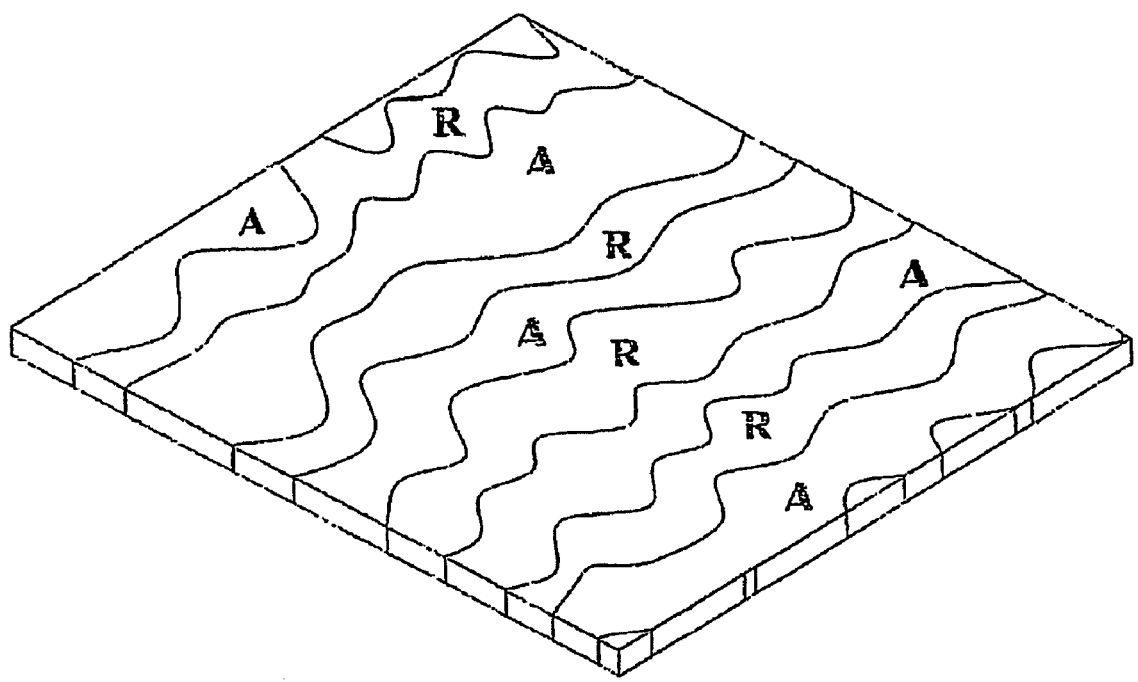
FIG. 2 is a description of a generalized concept of one aspect of the invention.

In accordance with the present invention, lubricated surfaces in relative sliding motion are treated to produce less wear and friction in the course of interaction. In most general terms, the process of the invention transforms a working surface so as to produce two interposed zones, one having a high degree of lubricant repellence, and the other having a relative attraction towards the lubricant. A schematic representation of the concept of the invention is shown in FIG. 2, to which reference is now made. A schematic working surface is shown which is composed of a combination of zones. The zones marked A are lubricant attractive and the zones marked R are relatively lubricant repelling.

Figure 3A:
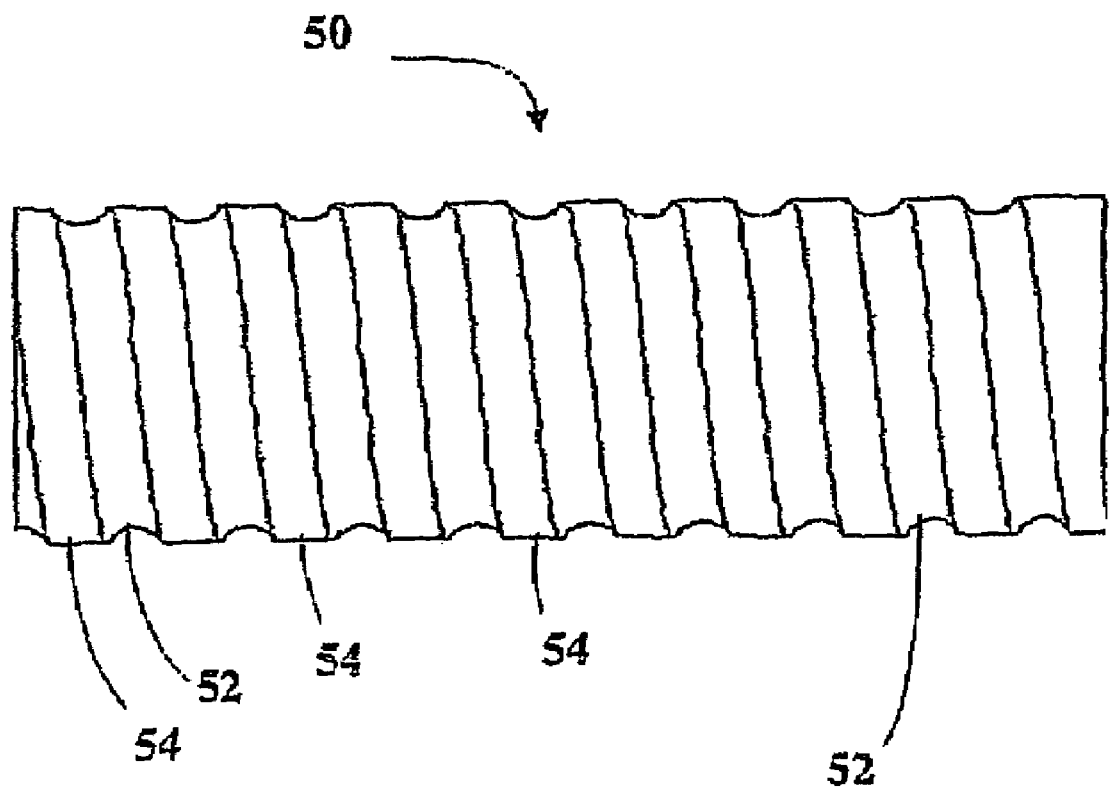
FIG. 3A is a schematic side view of a grooved cylinder in accordance with the invention.
Figure 3B:
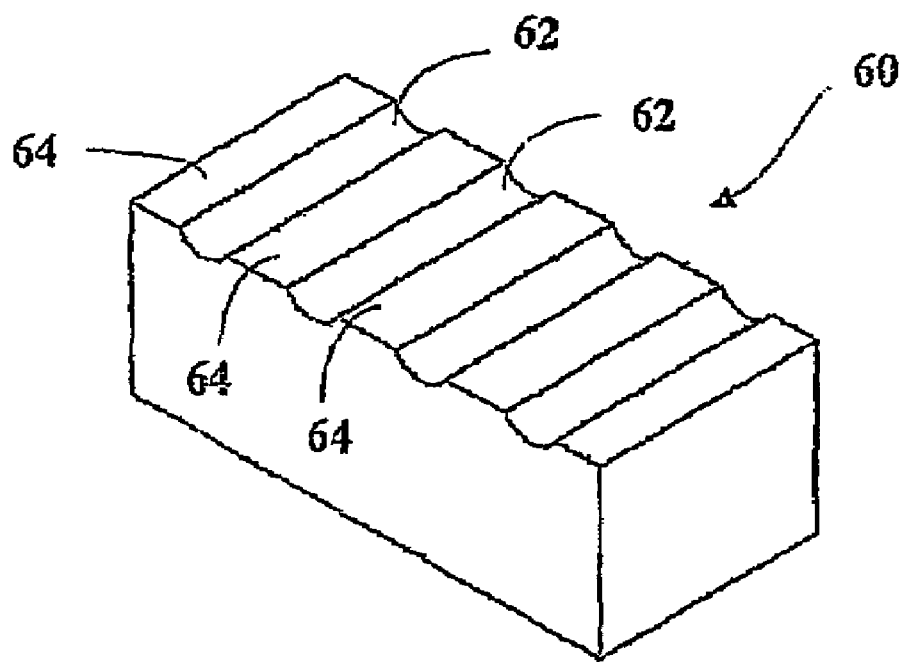
FIG. 3B is a schematic view of a metal plate, the working surface of which is grooved, in accordance with the invention.

In a preferred embodiment of the invention, the difference between the zones with respect to attraction to the lubricant is associated with a structural difference. The structural aspects of the system of this embodiment of the invention are schematically described in reference to FIGS. 3A-B. In FIG. 3A, a cylinder 50 has its surface structured such that one or more grooves, such as helical groove 52, are engraved on the surface. Typically, such grooves have a maximum depth of about 5-30 microns, and a width of about 100-1000 microns. The remainder of the original surface is one or more ridges, in this example, a helical ridge 54. Thus, the exterior of cylinder 50 includes two zones, the superficial zone that includes the ridges, and the recessed zone including the grooves. In FIG. 3B, a metal slab 60 has been processed in accordance with the present invention. The working surface, after undergoing a frictional interaction with another element (not shown), includes grooves 62, the assembly of which become the recessed zone, and alternate ridges 64, which form the superficial zone of the working surface of metal slab 60.

Zone Patterns

Figure 4A:
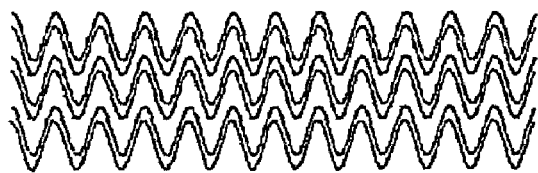
FIG. 4A is a pattern of dense sinusoidal grooving, in accordance with an embodiment of the invention.
Figure 4C:
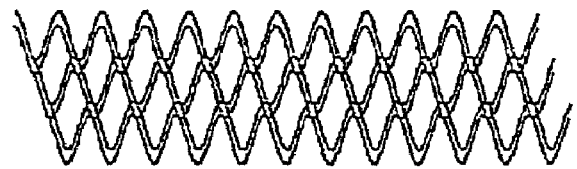
FIG. 4C is a sinusoidal pattern of grooving, containing overlapping waves, in accordance with an embodiment of the invention.
Figure 4B:
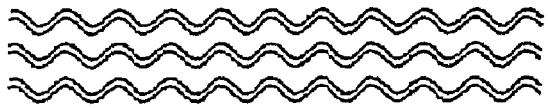
FIG. 4B is a pattern of sinusoidal grooving, in accordance with an embodiment of the invention.
Figure 4D:
FIG. 4D is a pitted pattern of grooving in accordance with an embodiment of the invention.
Figure 4E:
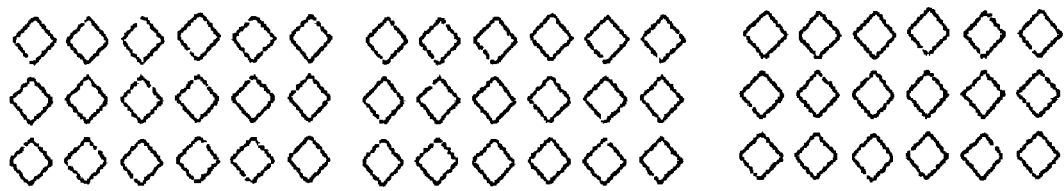
FIG. 4E is a pattern of rhomboidal grooving, in accordance with all embodiments of the invention.
Figure 4F:
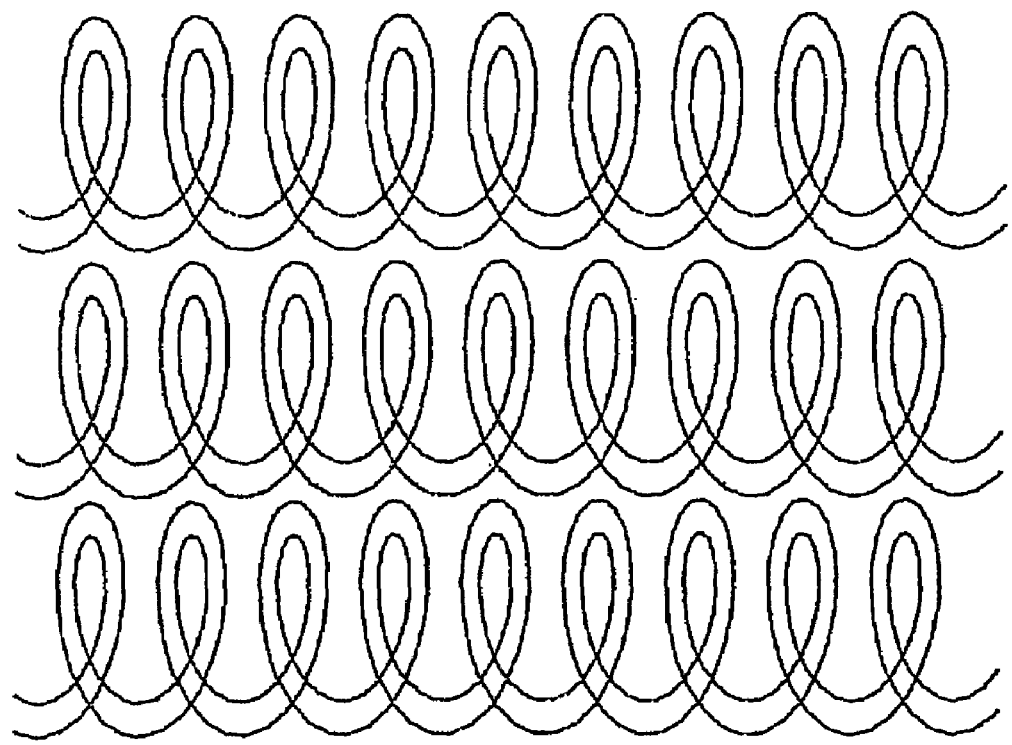
FIG. 4F is a pattern of helical grooving, in accordance with an embodiment of the invention.

In FIGS. 4A-F are provided exemplary, schematic patterns of recesses, such as microgrooves, which are suitable for the structural aspects of embodiments of the present invention. FIGS. 4A-B show sinusoidal patterns of varying density; FIG. 4C shows a sinusoidal pattern containing overlapping sinuses; FIG. 4D shows a pitted pattern; FIG. 4E shows a pattern of rhomboids, and FIG. 4F shows a helical pattern. The diversity of optional patterns is very large, and the examples given above constitute only a representative handful.

Processing the Working Surface

Figure 5:
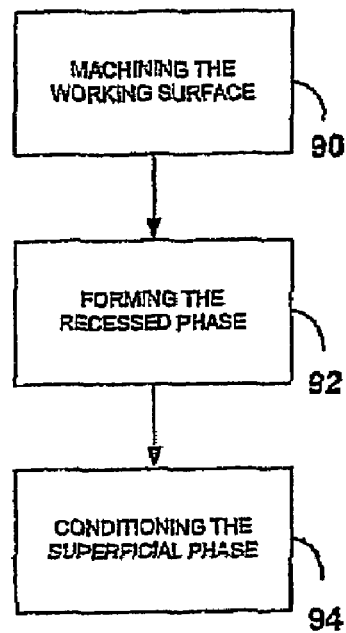
FIG. 5 is a flow chart of the process of conditioning a working surface in accordance with one embodiment of the invention.

In some embodiments, mechanical processing of a working surface for the purpose of conveying particular frictional properties requires a change in the relief of the working surface. In a preferred process for conditioning the working surface, described schematically in FIG. 5, forming a recessed zone and conditioning the superficial zone take place in the following order: in step 90, the working surface is machined by abrading and/or lapping so as to obtain a high degree of flatness and surface finish. In step 92, the recessed zone is formed as will be explained later on, and in step 94, the superficial zone of the working surface undergoes lapping.

Lapping of the superficial zone has been found to achieve a very good flatness rating, and very good finish. The lapping technique uses a free-flowing abrasive material, as compared to grinding, which uses fixed abrasives. Lapping is also well distinguished from polishing processes, which are characterized by high speeds and low loads, relative to lapping processes. The effect on the surface of the workpiece is very different. In lapping, the load and relative motion between the surface of the workpiece and the lapping tool surface cause the abrasive particles to cut stork out of the surface. In polishing, by sharp contrast, the relative motion between polishing tool and workpiece surface is of such high magnitude as to effect localized melting of the workpiece surface.

As used herein in the specification and in the claims section that follows, the term "lapping" is meant to exclude such polishing systems and methods.

Figure 6A:
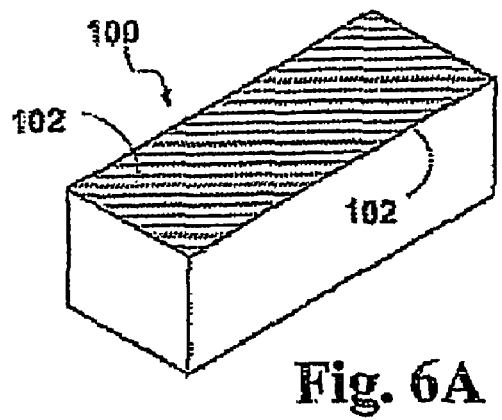
FIG. 6A is schematic view of an interacting surface used in conjunction with the inventive lapping system.
Figure 6B:
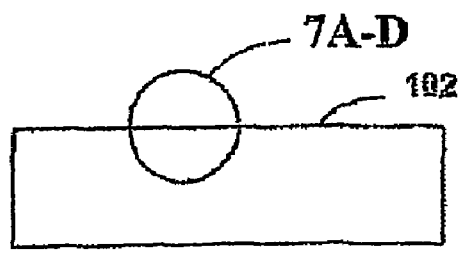
FIG. 6B is a schematic description of a side view of the interacting surface of FIG. 6A.
Figure 7A:
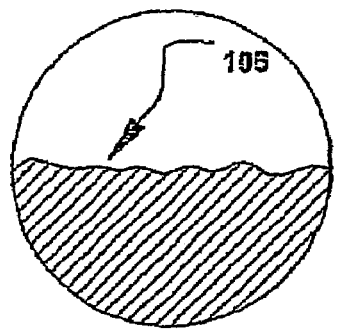
FIG. 7A is a cross-sectional schematic description of a working surface.
Figure 7B:
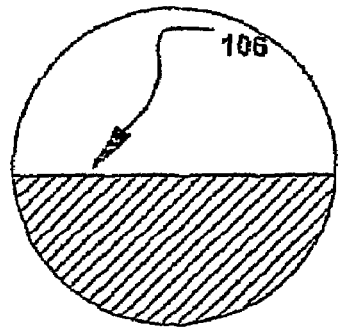
FIG. 7B is a cross-sectional schematic description of a leveled surface.
Figure 7C:
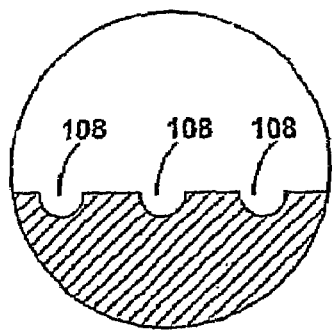
FIG. 7C is a cross-sectional schematic description of the leveled surface after micro-grooving.
Figure 7D:
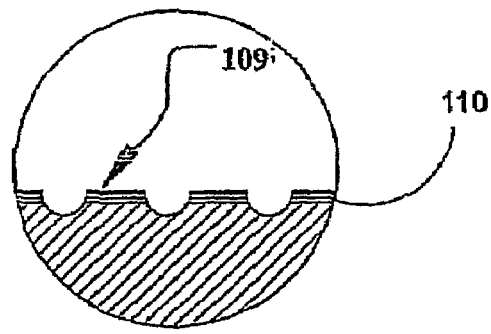
FIG. 7D is a cross-sectional schematic description of a grooved surface having conditioned ridges.

FIG. 6A describes schematically an interacting surface 100, the working surface 102 of which is to be processed in accordance with an embodiment of the invention. A schematic sectional view of the surface is shown in FIG. 6B, indicating the position of an enlarged view of the cross-section shown in FIGS. 7A-D. In FIG. 7A, the pre-machined surface 106 is shown. In FIG. 7B, the machined surface is shown leveled. In FIG. 7C, surface 106 is shown after microgrooves 108 have been formed. In the next step, as shown in FIG. 7D, the working surface has been transformed, to convey lubricant-repelling properties to superficial zone 109. A new layer has formed within the superficial zone, this layer designated schematically by the number 110. This layer will be discussed in greater detail hereinbelow.

The lapping step preferably succeeds the microgrooving step, because in forming the recessed microstructures on the surface, bulging of the surface around the microstructures is common. The bulges may appear even if the structural changes are effected by laser-cutting. This is illustrated schematically in FIGS. 8A-B, to which reference is now made. In FIG. 8A, recessed microstructures or microgrooves 121 have been formed in working surface 120. Around the edges of recessed microstructures 121 are disposed bulges 122, produced in the formation of microstructures 121. After the inventive lapping process, the bulges are leveled, and a plastically deformed region 124 is produced (see FIG. 8B) near the surface of working surface 120.

Lapping is the preferred mechanical finishing method for obtaining the characteristics of the working surface of the mechanical element in accordance with the present invention. The lapping is performed using a lapping tool, the surface of which is softer than the working surface of the processed mechanical part, and a paste containing abrasive grit. The paste may be a conventional paste used in conventional lapping processes. In order to be effective, the abrasive grit must be much harder than the face of the lapping tool, and harder than the processed working surface. Aluminum oxide has been found to be a suitable abrasive material for a variety of lapping surfaces and working surfaces, in accordance with the invention.

Figure 9A:
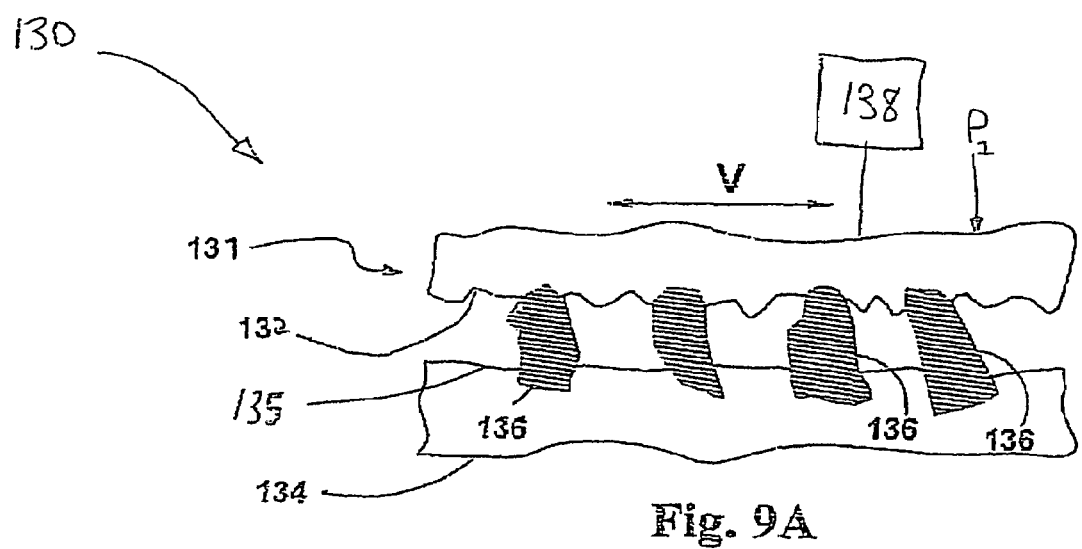
FIG. 9A is a cross-sectional schematic description of a lapping tool—working surface interface prior to lapping, in accordance with the invention.
Figure 9B:
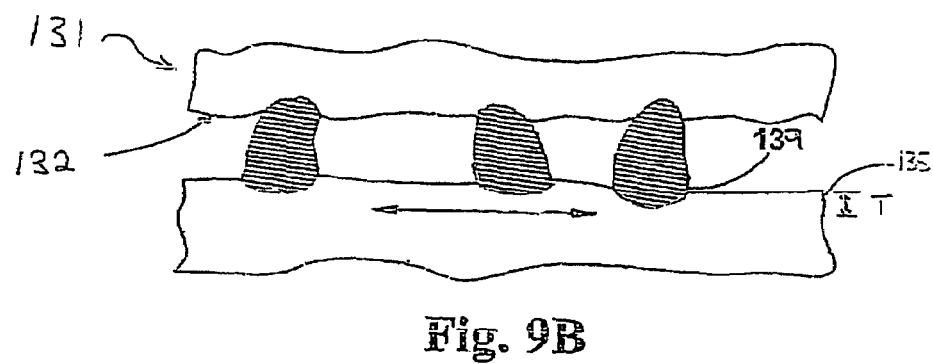
FIG. 9B is a cross-sectional schematic description of the lapping tool—working surface condition after lapping has progressed, in accordance with the invention.

FIGS. 9A-B schematically present progressive steps in the inventive lapping process, in which the conditioning of the working surface is promoted. The initial condition of one aspect of the inventive lapping system 130 is shown schematically in FIG. 9A. The irregular topography of a working surface 132 (disposed on a workpiece 131) faces a lapping tool 134 and is separated by an irregular distance therefrom. Abrasive particles 136 are partially embedded in contact surface 135 of lapping tool 134, and to a lesser extent, in working surface 132. Working surface 132 and contact surface 135 are made to move in a relative motion by mechanism 138. This motion has an instantaneous magnitude V. Mechanism 138 also exerts a load, or a pressure $P_1$, that is substantially normal to contact surface 135 and working surface 132.

In FIG. 9B, some lapping action has taken place, causing working surface 132 to become less irregular. As a result of the relative movement between the surfaces, the abrasive particles, such as abrasive particle 139, are now rounded to some extent, losing some of their sharp edges in the course of rubbing against the surfaces.

While initially, abrasive particles 136 penetrate into working surface 132 and gouge out material therefrom, as the process continues, and the abrasive particles become rounded, substantially no additional stock is removed from the processed part. Instead, the lapping movement effects a plastic deformation in working surface 132 of workpiece 131, so as to increase the micro-hardness of working surface 132.

FIG. 9C (i)-(iii) are an additional schematic representation of a working surface being conditioned in a lapping process and system of the present invention. In FIG. 9C(i), a working surface 132 of a workpiece 131 faces a contact surface 135 of lapping tool 134. An abrasive paste containing abrasive particles, of which is illustrated a typical abrasive particle 136, is disposed between working surface 132 and contact surface 135. As in conventional lapping technologies, contact surface 135 of lapping tool 134 is made of a material having a greater wear-resistance and a lower hardness with respect to working surface 132. The composition and size distribution of the abrasive particles are selected so as to readily wear down working surface 132 according to plan, such as reducing surface roughness to a pre-determined roughness.

A load is exerted in a substantially normal direction to surfaces 132 and 135, causing abrasive particle 136 to penetrate working surface 132 and contact surface 135, and resulting in a pressure P being exerted on a section of abrasive particle 136 that is embedded in working surface 132. The penetration depth of abrasive particle 136 into working surface 132 is designated by $h_{a2}$; the penetration depth of abrasive particle 136 into contact surface 135 is designated by $h_{b2}$. Abrasive particle 136 penetrates into lapping tool 134 to a much greater extent than the penetration into workpiece 131, such that $h_{b2} \gg h_{a2}$. Significantly, because of the substantial elastic character of the deformation of inventive contact surface 135, the penetration depth of abrasive particle 136 into contact surface 135 is much larger than the penetration depths of identical abrasive particles into contact surfaces of the prior art (under the same pressure P), i.e., $$h_{b2} > h_{b1},$$

where $h_{b1}$ is defined in FIG. 1C(i). Consequently, the penetration depth of abrasive particle 136 into working surface 132, $h_{a2}$, is much smaller than the corresponding penetration depth, $h_{a1}$, of the prior art, i.e., $$h_{a2} > h_{a1},$$

In FIG. 9C(ii), work-piece 131 and lapping tool 134 are made to move in a relative velocity V. The pressure P, and relative velocity V of workpiece 131 and lapping tool 134, are of a magnitude such that abrasive particle 136, acting like a cutting tool, gouges out a chip of surface material from workpiece 131. This chip is typically much smaller than the chips that are gouged out of the working surfaces conditioned by lapping technologies of the prior art.

In FIGS. 9C(ii)-(iii), relative velocity V is selected such that a corresponding shear force Q is large enough, with respect to pressure P, such that the direction of combined force vector F on abrasive particle 136 causes abrasive particle 136 to rotate. During this rotation, the elasticity of lapping tool 134 and contact surface 135 results in less internal strains within abrasive particle 136, with respect to the prior art, such that a typical particle, such as abrasive particle 136, does not shatter, rather, the edges of the surface become rounded. An idealization of this rounding phenomenon is provided schematically in FIG. 9C(iii).

The working surfaces of the present invention have an intrinsic microstructure that influences various macroscopic properties of the surface. Without wishing to be limited by theory, it is believed that the inventive lapping system effects a plastic deformation in the working surface, so as to improve the microstructure of the working surface. One manifestation of the modified microstructure is a greatly increased micro-hardness.

Figure 10:
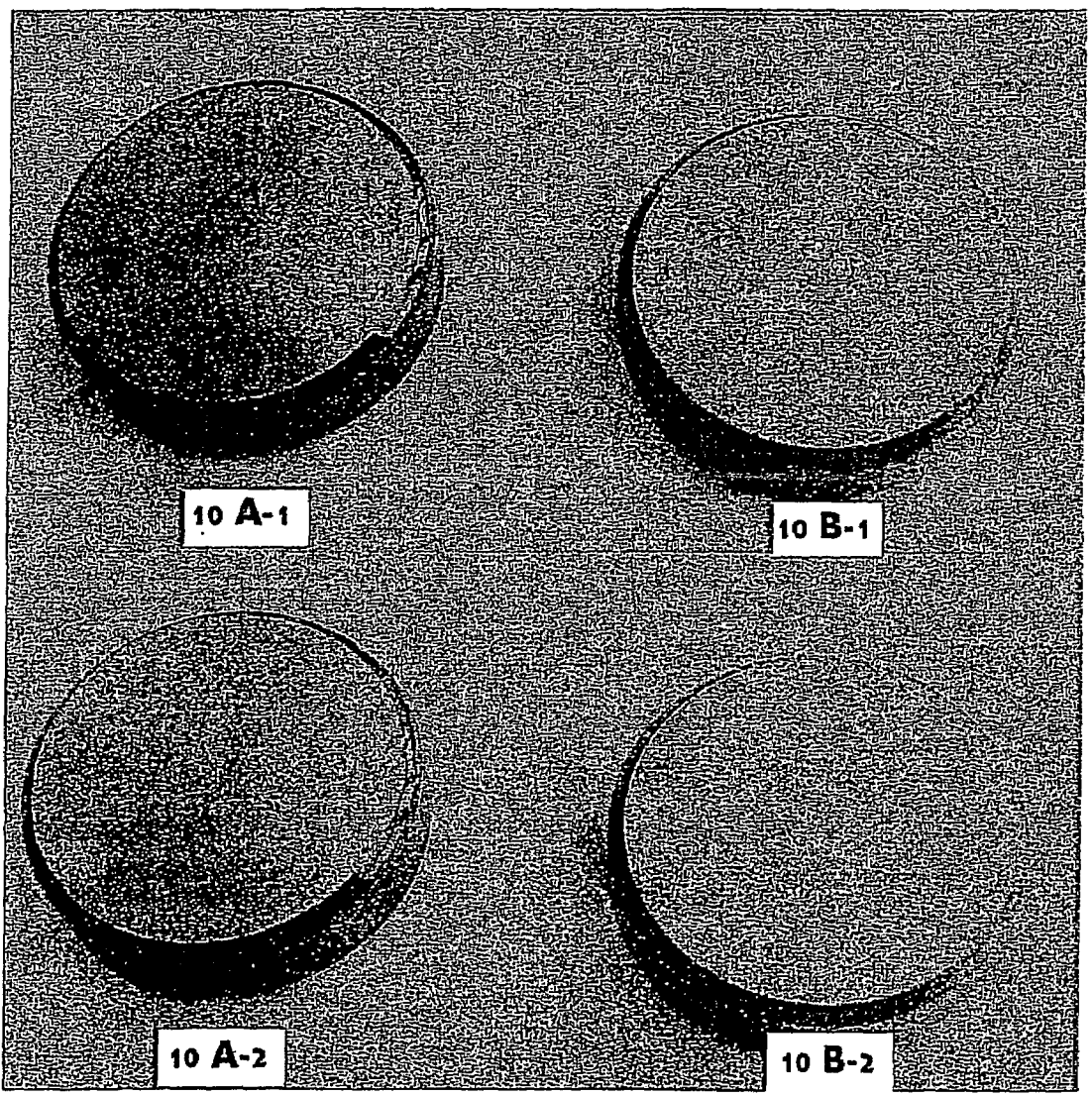

Another manifestation of the modified microstructure is the characteristic wetting property of the inventive surface, as shown in 10B-1 and FIG. 10B-2. The characteristic wetting property of a reference surface is shown, for comparative purposes, in FIG. 10A-1 and FIG. 10A-2.

Figure 1B:
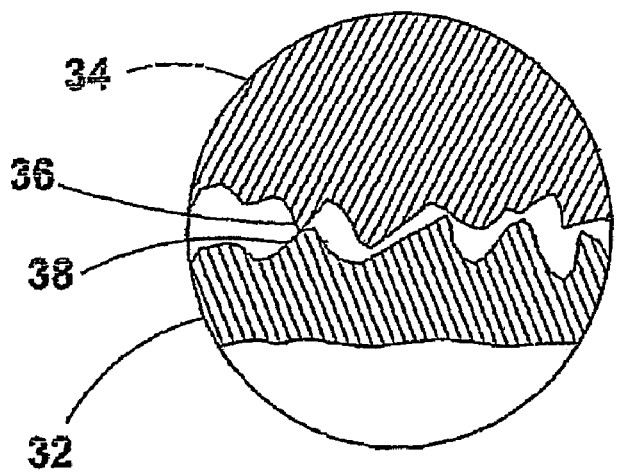
FIG. 1B is a schematic description of mechanically interacting surfaces having interacting asperities.

Both the reference surface specimen and the inventive surface specimen are made out of annealed SAE 4340 steel (HRC=54). A single drop of C22 oil was dispersed over the entire surface of each specimen, such that coverage or wetting was substantially 100%. Subsequently, the wetted area was monitored as a function of time. FIG. 10A-1 represents the reference working surface 5 seconds after the oil drop was distributed, and FIG. 10A1-2 represents the identical working surface, 60 seconds after the oil drop was distributed. As expected, the reference surface specimen remained completely covered by the layer of oil, and continued to be completely covered for the entire duration of the test (24 hours).

FIG. 10B-1 and FIG. 10B-2 are photographic representations of wetting patterns of an exemplary inventive working surface that was initially covered with oil, wherein FIG. 10B-1 represents the inventive working surface 5 seconds after al oil drop was distributed, and FIG. 10B1-2 represents the identical work surface. 60 seconds after the oil drop was distributed. By sharp contrast to the reference specimen, the wetted area decreased rapidly in a matter of seconds.

The characteristic dimensionless wetting coefficient, defined by:

$$\frac{A(t)}{A_0}$$

wherein $A(t)$ is the nominal wetted area of the working surface as a function of time, and $A_0$ is the nominal surface area of the working surface, decreased from a value of 1 at t=0 to about 0.85 after only 5 seconds. After 1 minute, the characteristic dimensionless wetting coefficient decreased below 0.25. As discussed hereinabove, this liquid repelling quality of the inventive working surface is associated with reduced friction and wear, reduced risk of seizure, and extended operating life of mechanical elements incorporating such surfaces.

Mechanical Criteria for the Contact Surface of the Lapping Tool

It has been found that lapping using a lapping tool having a somewhat elastic, organic, polymeric surface promotes micro-hardness and other tribological properties of the working surface. The mechanical criteria with which the inventive polymeric surface should preferably comply include:

1. wear resistance with respect to the abrasive paste used in the lapping process;
2. elastic deformation such that individual abrasive particles protrude into, and are held by, the polymeric surface; as the individual abrasive particles rotate during contact with the working surface, the elastic deformation should enable the particles to be absorbed into the polymeric surface in varying depths, according to the varying pressures exerted between the particles and the working surface. Consequently, the abrasive particles rotate against the working surface and become more rounded with time, instead of undergoing communication (being ground into a fine powder);
3. the hardness of the polymeric surface should be selected such that the elastic layer does not appreciably break or grind the abrasive powder.

Thus, contact surface 135 of lapping tool 134 (see FIGS. 9A-9B, and FIGS. 9C(i)-9C(iii)) is an organic, polymeric surface. If contact surface 135 is a layer that is mechanically supported (e.g, on a metal backing), surface 135 preferably has a thickness T (see FIG. 9B) of at least 0.5 mm. Alternatively, organic, polymeric contact surface 135 has a thickness T of at least 5 mm and more preferably at least 8-10 mm, such that contact surface 135 is substantially self-supporting.

The inventors have further discovered that a mixture of epoxy cement and polyurethane in a ratio of about 25:75 to 90:10, by weight, is suitable for forming the contact surface of the lapping tool. In the epoxy cement/polyurethane mixture, the epoxy provides the hardness, whereas the polyurethane provides the requisite elasticity and wear-resistance. It is believed that the polyurethane also contributes more significantly to the deposition of an orgasmic, possibly polymeric nanolayer on at least a portion of the working surface, as will be developed in further detail hereinbelow. It will be appreciated by one skilled in the art that the production of the epoxy cement/polyurethane mixture can be achieved using known synthesis and production techniques.

More preferably, the weight ratio of epoxy cement to polyurethane ranges from about 1:2 to about 2:1, and even more preferably, from about 3:5 to about 7:5.

In terms of absolute composition, by weight, the lapping tool surface typically contains at least 10%, polyurethane, preferably, between 20% and 75% polyurethane, more preferably, between 40% and 75% polyurethane, and most preferably, between 40% (inclusive) and 65% (inclusive).

The inventive contact surface of the lapping tool should preferably contain, by weight, at least 10% epoxy, more preferably, at least 35% epoxy, yet more preferably, at least 40% epoxy, and most preferably, between 40% (inclusive) and 70% (inclusive). In some applications, however, the elastic layer should preferably contain, by weight, at least 60% epoxy, and in some cases, at least 80% epoxy.

Preferably, the inventive contact surface (lapping surface) should have the following combination of physical and mechanical properties:

Shore D hardness within a range of 40-90, preferably 60-90, more preferably 65-82, and most preferably, 70-80;

impact resistance (with notch) within a range of 3-20 $kJ/m^2$, preferably 3-12 $kJ/m^2$, more preferably 4-9 $kJ/m^2$, and most preferably, 5-8 $kJ/m^2$, according to ASTM STANDARD D 256-97;

It should be appreciated that a variety of materials or combinations of materials could be developed, by one skilled in the art, that would satisfy these physical and mechanical property requirements.

An exemplary lapping tool surface of the present invention is synthesized as follows: an epoxy resin, a polyol and a di-isocyanate are reacted at a temperature exceeding room temperature and less than about 150° C. Subsequently, a hardener is mixed in. As will be evident to one skilled in the art, the requisite curing conditions depend largely upon the particular qualities and ratios of the above-mentioned ingredients. It will be further evident to one skilled in the art that the polymer can be produced as a bulk polymer or as a molded polymer.

While advantageous ratios of the epoxy and polyurethane materials have provided hereinabove and in the claims section hereinbelow, it should be appreciated that other polymers or combinations of polymers having the requisite mechanical and physical properties for use in conjunction with the inventive device and method could be developed by one skilled in the art.

In the laboratory, a steel (AISI1040) sample (henceforth, "sample 403") underwent grinding and subsequently was machined using abrasive paste (containing alumina particles), using the lapping tool and method of the present invention.

A standard or reference sample 40 (henceforth, "standard sample 40"), also of AISI1040 steel, underwent grinding, and was not subjected to further treatment.

The elemental composition of Fe samples at the surface and in-depth concentration distributions ("sputter depth-profiling") were estimated by surface-sensitive Auger Electron Spectroscopy (AES) combined with controlled argon-ion bombardment.

Figure 11A:
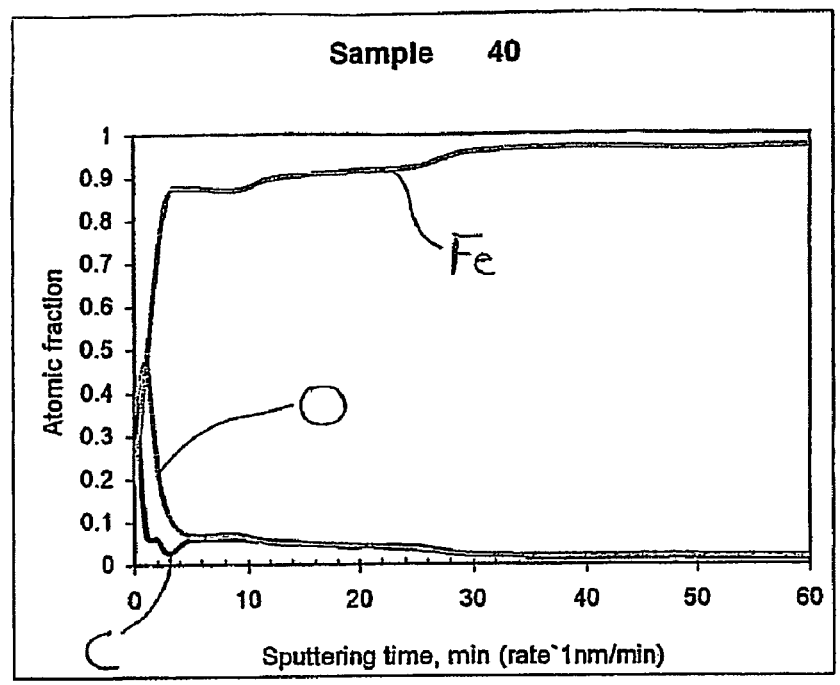
FIG. 11A is a sputter depth-profiling plot of various elemental compositions in a conventional working surface.
Figure 11B:
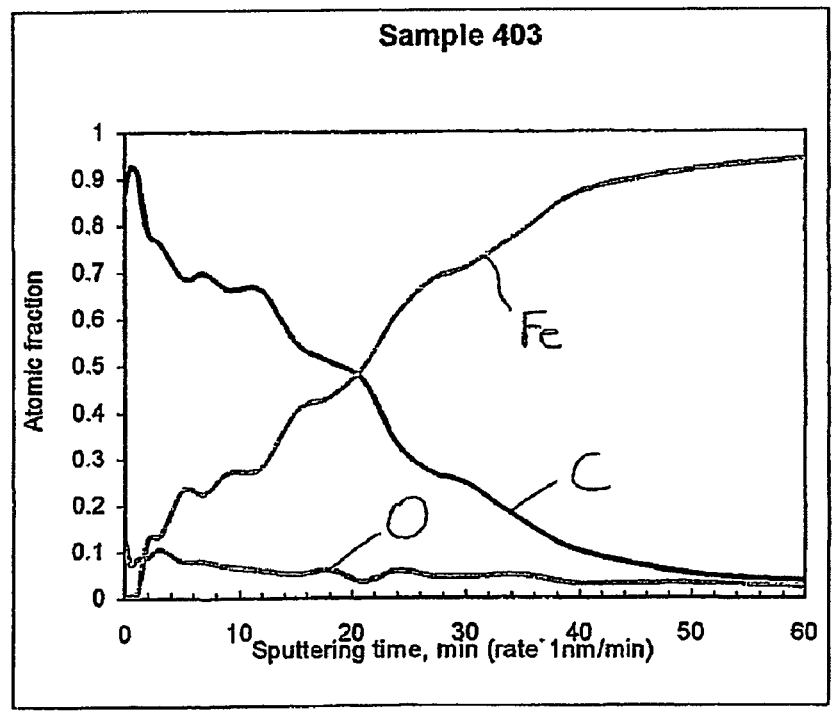
FIG. 11B is a sputter depth-profiling plot of various elemental compositions in a working surface of the present invention.
Figure 11A:
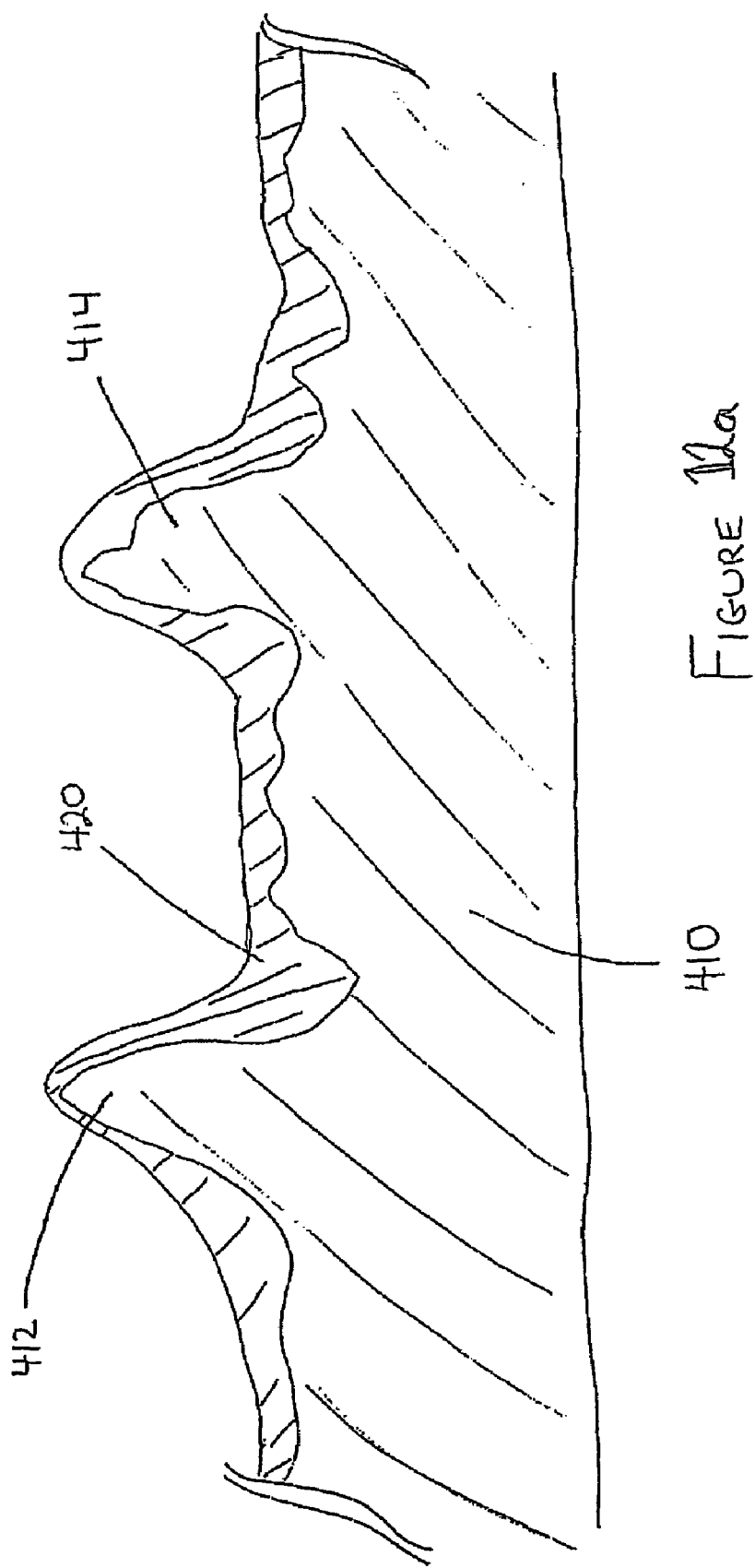

The results of the AES depth-profiling are plotted in FIG. 11a for standard sample 40, and in FIG. 11b for sample 403. The intensities of the carbon (C), oxygen (O) and iron (Fe) peaks provide a quantitative, elemental analysis of the first 60 nanometers of the surface layer of each sample.

The surface of standard sample 40 (sputtering time=0) contains (in atom %) approximately 20% Fe, 44% C, and 36% O. By sharp contrast, the surface of sample 403 contains substantially 0% Fe, and approximately 88% C and 12% O.

With increasing sputtering time, the AES depth profiling shows that the C content of standard sample 40 drops rapidly—within 1-2 nm—to about 5%, while the Fe content surges to over 85% at a depth of 4 nm from the surface.

By sharp contrast, the AES depth profiling shows that the C content of sample 403 drops gradually and almost linearly over 40-50 nm—to about 10%. At a depth of 20 nm, the C content of sample 403 is approximately 50%, which is higher than the C content of standard sample 40 at the surface. Also, the Fe content increases largely according to the decrease in the C content, such that at a depth of 20 nm from the surface, the Fe content of sample 403 is still less than 50%.

With reference now to FIG. 12a, using the lapping tool and method of the present invention, it has surprisingly been discovered that an extremely-thin, typically nanometric, solid, carbon-containing coating or film 420 is applied on the working surface 410. A substantial (though not necessarily exclusive) source of the carbon-containing coating is the carbon-containing material on the surface of the inventive lapping tool. Alternatively or additionally, the source of the carbon-containing coating can be carbon-containing particles and materials (e.g., polymeric materials) added to the abrasive paste used in the lapping process.

Figure 12B:
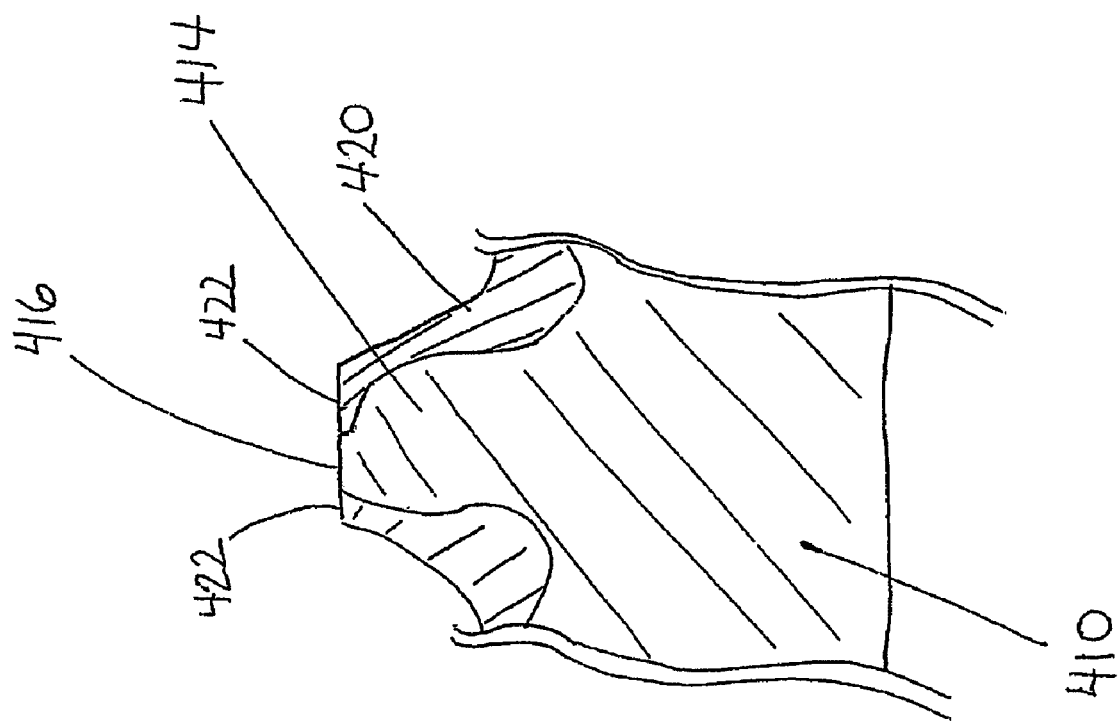
FIG. 12B shows a portion of the diagram of FIG. 12A, after removing several nanolayers of the working surface.

Typically, asperities 412, 414, which protrude from working surface 410, are also covered by coating 420. In FIG. 12b, which shows a portion of working surface 410 from FIG. 12a, coating 420 exhibits wear, particularly in the area covering the asperities. Eventually, the asperities themselves, such as asperity 414, undergo attrition. In this state, an exposed surface area 416 of asperity 414 is largely surrounded by exposed coating area 422. Consequently, any lubricant in the vicinity of exposed surface area 416 tends to migrate from exposed coating area 422 towards exposed surface area 416 of asperity 414, such that superior lubricating conditions are maintained.

It must be emphasized that the coated working surface of FIGS. 12a-b differs from all the other coated working surfaces of the prior art and all the other coated working surfaces presented herein (e.g., FIGS. 14A-14C described hereinbelow) in various fundamental ways. These include:

the coating or film in FIG. 12a is a nanometric film having an average thickness of up to 200 nm, and more preferably, 5-200 nm. Typically, the nanometric film has an average thickness of 5-100 nm. Excellent experimental results have been obtained for working surfaces having nanometric films of an average thickness of 5-50 nm.

Figures 14A, 14B, 14C:
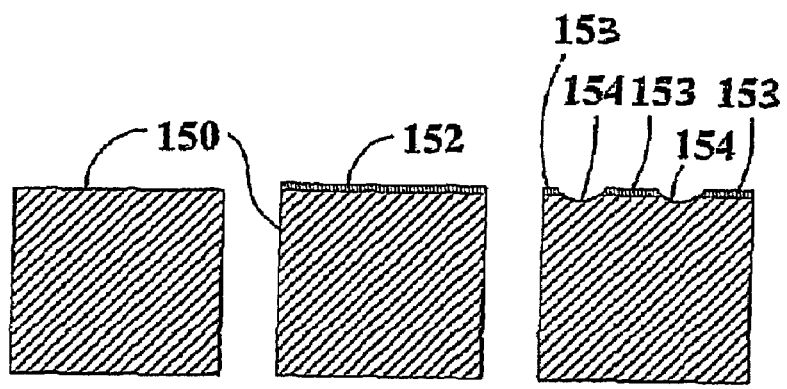
FIG. 14A is a cross-sectional schematic illustration of a pre-coated surface.
FIG. 14B is a cross-sectional schematic illustration of the coated surface of FIG. 14A.
FIG. 14C is a cross-sectional schematic illustration of the micro-grooves of the surface of FIG. 14B, in accordance with another embodiment of the invention.

By sharp contrast, the plastic coatings described in FIGS. 14A-14C have a thickness that is similar to that of the grooves, and always exceeds several microns.

the deposition of the nanometric film is performed by the inventive lapping method itself.

the material source of the nanometric film is from the inventive contact surface of the lapping tool, or from materials disposed in the paste.

the nanometric film is intimately bonded to the working surface by filling the nanometric contours of the working surface.

the nanometric film is strongly adhesive to the working surface. Consequently, the film is not subject to the phenomena of peeling, flaking, crumbling, etc., which characterize coatings of the prior art.

the microrelief is performed prior to deposition of the nanometric coating.

It must be further emphasized that the nanometric film is bonded, on one side, to the surface of the work-piece, and on the opposite side, the nanometric film becomes the working surface of the workpiece, being exposed to the lubricant and to the frictional forces resulting from the relative motion of the working and counter surfaces (and the load thereon).

Figure 13:
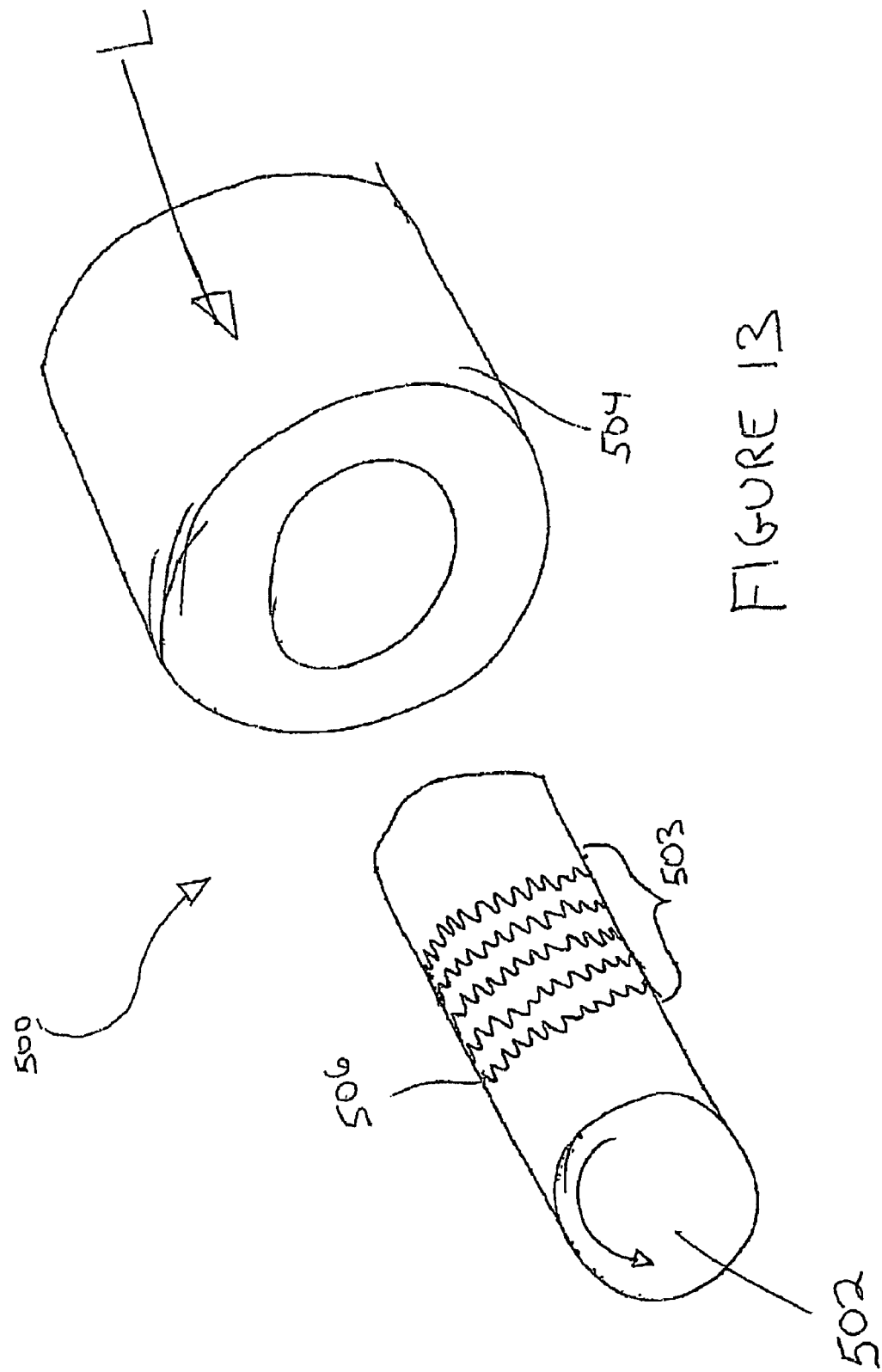
FIG. 13 is a schematic drawing of an exemplary tribological system according to one aspect of the present invention.

FIG. 13 is a schematic drawing of an exemplary tribological system 500 according to one aspect of the present invention. Tribological system 500 includes a rotating working piece 502 (mechanism of rotation, not shown, is standard), having a working surface (contact area) 503 bearing a load L, a counter surface disposed within stationary element (bushing) 504, and a lubricant (not shown) disposed between working surface 502 and counter surface 504. Working surface 503 is an inventive working surface of the present invention, as described hereinabove. Recessed zones (grooves 506) serve as a reservoir for the lubricant and as a trap for debris.

It must be emphasized that the inventive lapping method and inventive working surface produced thereby, after producing grooving patterns in the working surface, achieves a surprisingly-high performance with respect to prior-art lapping surfaces combined with the identical grooving patterns, and as demonstrated experimentally (see Example 3 and Table 4 below).

In another embodiment of the present invention, a plastic coat is applied on the working surface instead of mechanically conditioning the superficial zone.

The procedure for coating the working surface includes first covering the working surface with a precursor of the coat. The main stages in the processing of a working surface in accordance with this embodiment of the invention are illustrated in FIGS. 14A-C, to which reference is now made. In FIG. 14A, the working surface is designated 150. In FIG. 14B, a plastic coat 152 is disposed on working surface 150. After coat 152 is deposited, portions of coat 152 are removed, by way of example, by subjecting working surface 150 and coat 152 to micro-grooving, as shown schematically in FIG. 14C. The micro-grooves or recesses 154 penetrate through plastic coat 152 and into working surface 150. In this example, ridges 153, having a surface made of plastic coat 152, constitute a superficial zone, whereas recesses 154 constitute a recessed zone. The recessed zone is more attractive to the lubricant applied to the working surface than is the superficial zone.

Figure 15:
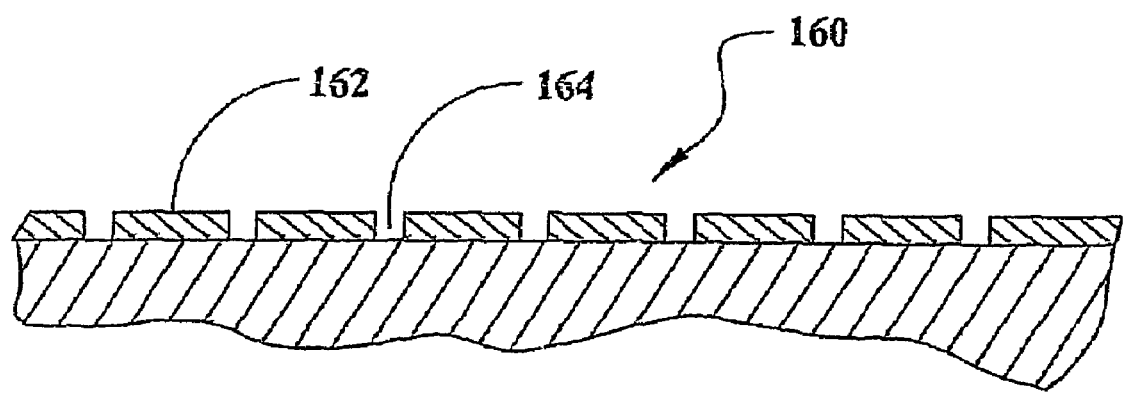
FIG. 15 is a cross-sectional schematic illustration of a working surface covered by a pitted plastic cover, in accordance with another embodiment of the invention.

In another embodiment of the invention, the working surface is pre-processed by grinding. Subsequently, the surface is coated by a layer of lubricant repelling tape, containing holes. The results of this procedure are shown schematically in FIG. 15. Working surface 160 is covered with a plastic perforated sheet 162, in which holes such as hole 164 are punched prior to coating.

Forming the Recessed Zone

In order to form the recessed zone, the working surface is micro-structured to obtain a plurality of recesses. This can be achieved by various methods known in the art, including mechanical cutting, laser engraving, and chemical etching. Methods for producing regular micro-relief in mechanical parts is taught by M. Levitin and B. Shamshidov in "A Disc on Flat Wear Test Under Starved Lubrication", Tribotest Journal 4-2, December 1997, (4), 159, the contents of which are incorporated by reference for all purposes as if fully set forth herein.

In another embodiment of the present invention, the inventive work surface is utilized in the internal wall of a surface of a vessel or conduit used for the transport of fluids, so as to reduce the friction at the surface of the internal walls, and correspondingly reduce the pressure loss and energy cost of pumping the fluid.

As used herein in the specification and in the claims section that follows, the term "conduit" refers to a vessel used for the transport of at least one liquid. The term "conduit" is specifically meant to include a tube, pipe, open conduit, internal surface of a pump, etc.).

Figure 16:
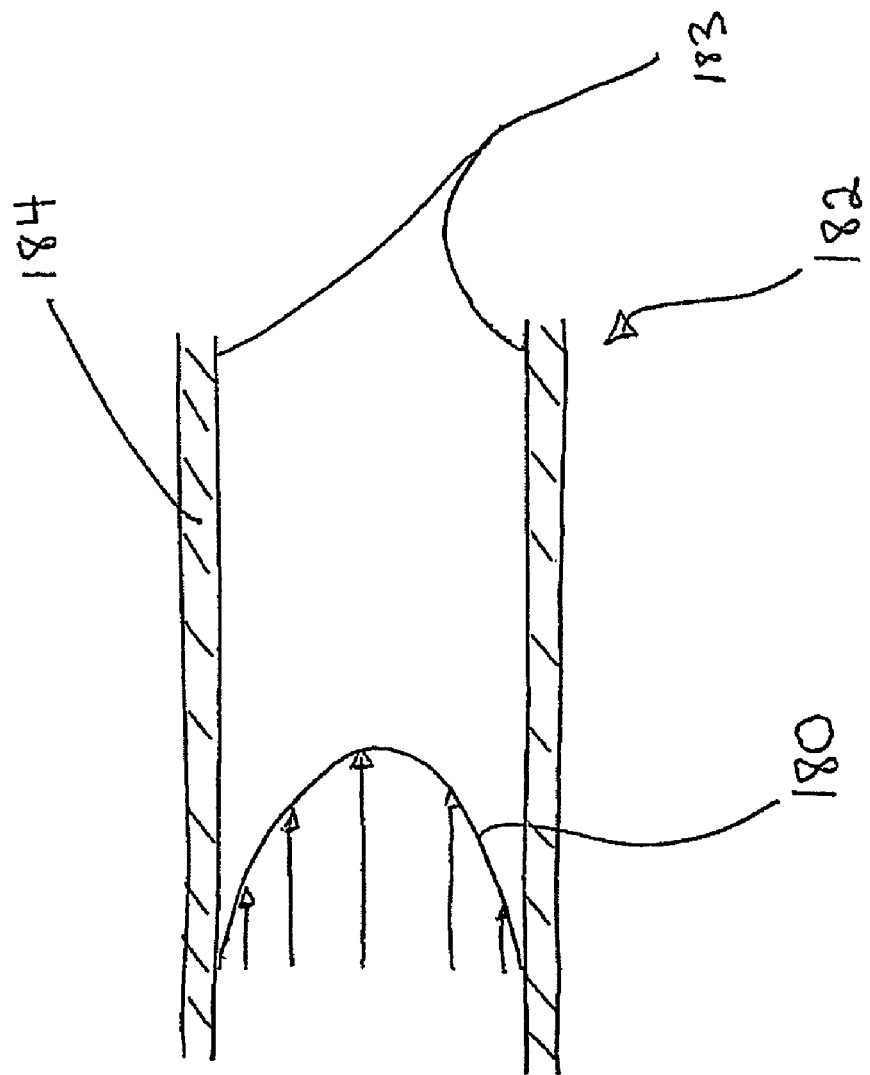
FIG. 16 is a cross-sectional schematic illustration showing a cross-sectional velocity profile of a fluid being transported in a conduit having an interior working surface according to the present invention.

FIG. 16 is a schematic diagram showing a cross-sectional velocity profile 180 of a fluid being transported in a conduit 182. Without wishing to be limited by theory, it is believed that due to the unique surface structure and energy of the inventive work surface, the forces of adherence adjacent to an inner working surface 183 of wall 184 are appreciably reduced. It is further believed that the thickness of the boundary layer adjacent to inner working surface 183 is also appreciably reduced, such that bulk-phase flow occurs much closer to wall 184 than in conventional metal conduits.

In another embodiment of the present invention, the inventive work surface and inventive lapping method and device are utilized in the production of artificial joints, e.g., hip joints. Conventional hip joints suffer from a number of disadvantages, which tend to reduce their effectiveness during use, and also shorten their life span. First, since the synovial fluid produced by the body after a joint replacement operation is considerably more diluted and thus 80% less viscous plan the synovial fluid originally present, the artificial joint components are never completely separated from each other by a fluid film. The materials used for artificial joints, as well as the sliding-regime parameters, allow only two types of lubrication: (i) mixed lubrication, and (ii) boundary lubrication, such that the load is carried by the metal femoral head surface sliding on the plastic or metal acetabular socket surface. This results in accelerated wear of the components, increasing the frictional forces, and contributes to the loosening of the joint components and, ultimately, to the malfunction of the joint.

The high wear rate of the ultra-high-weight polyethylene (UHWPE) cup results in increased penetration of the metal head into the cup, leading to abnormal biomechanics, which can cause loosening of the cup. Furthermore, polyethylene debris, which is generated during the wearing of the cup, produces adverse tissue reaction, which can induce the loosening of both prosthetic components, as well as cause other complications. Increased wear also produces metal wear particles, which penetrate tissues in the vicinity of the prosthesis. In addition, fibrous capsules, formed mainly of collagen, frequently surround the metallic and plastic wear particles. Wear of the metal components also produces metal ions, which are transported, with other particles, from the implanted prosthesis to various internal organs of the patient. These phenomena adversely affect the use of the prosthesis.

In addition, bone and bone cement particles, which remain in the cup during surgery, or which enter the contact zone between the hip and the cup during articulation, tend to become embedded in the cup surface. These embedded bone particles can cause damage to the head, which can, in turn, bring about greatly increased wear of the cup.

The treatment of the head friction surface using microstructuring technology, so as to reduce the wear of the friction surfaces, has been suggested in the literature (see Levitin, M., and Shamshidov, B., "A Laboratory Study of Friction in Hip Implants", Tribotest Journal 5-4, June 1999, the contents of which are incorporated by reference for all purposes as if fully set forth herein). The microrelief technology improves lubrication and friction characteristics, and facilitates the removal of wear debris, bone fractions, and bone cement particles from the friction zone between the male and female components of the joint.

Figure 17:
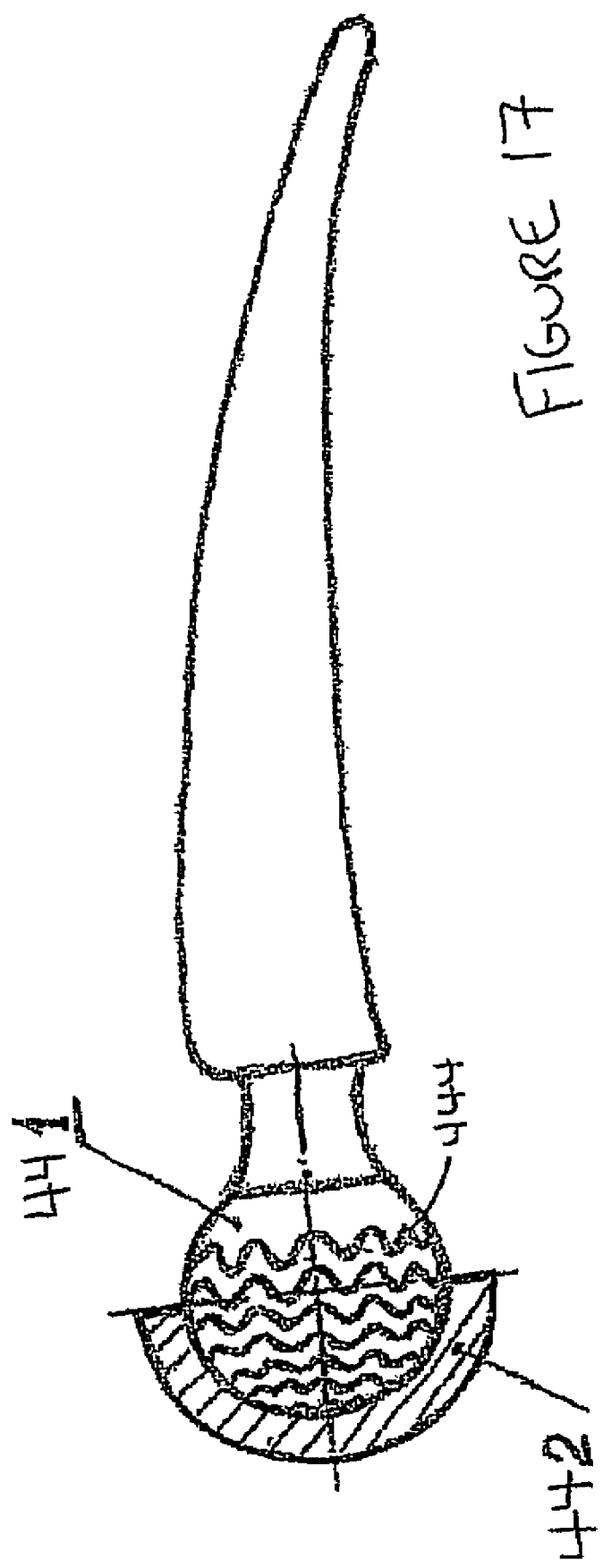
FIG. 17 is a cross-sectional schematic illustration of an artificial joint for implanting in a living body.

There is, however, a well-recognized need for further improvement in reducing friction and wear in artificial joints. In another embodiment of the present invention, shown in FIG. 17, a metal joint head 441 is engaged within a metal cup 442. Optionally, metal joint head 441 has grooves 444 (recesses, pores, etc.) according to microstructuring technology known in the art. Metal joint head 441 has been subjected to the lapping methods of the present invention, so as to produce the inventive working surface.

Preferably, the surface of metal joint head 441 is coated with an extremely-thin, typically nanometric, carbon-containing (or polymeric) coating or layer, as described hereinabove with reference to FIG. 12a.

EXAMPLES

Reference is now made to the following examples, which together with the above description, illustrate the invention in a non-limiting fashion.

Example 1

Figure 18:
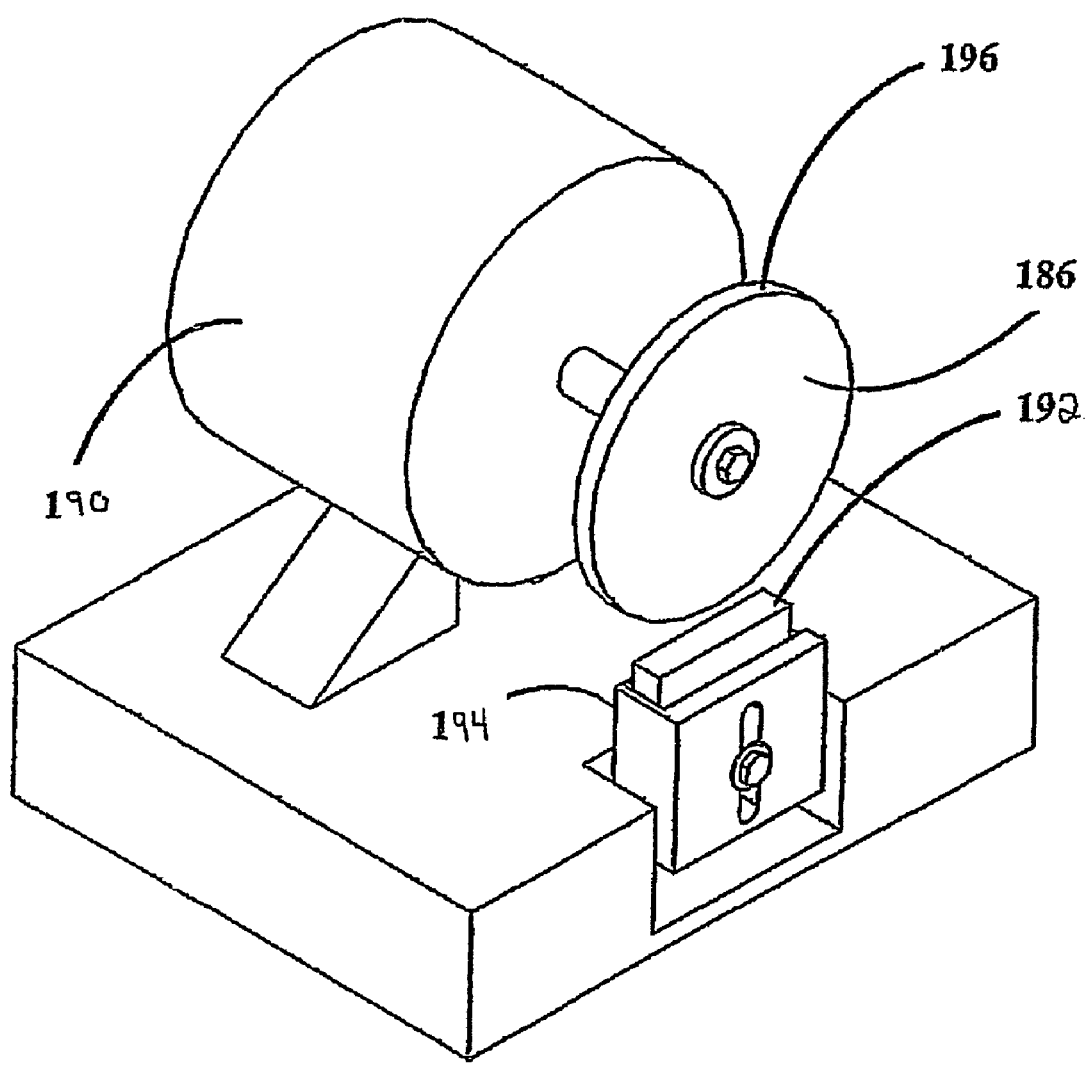
FIG. 18 is an isometric schematic description of an experimental set-up for testing discs conditioned in accordance with the invention.

The experimental set-up is described schematically in FIG. 18, to which reference is now made. An interchangeable set of carbon steel discs of 30 mm diameter, such as disc 186, rotatable around an axle, is made to rotate against a flat counter-plate 192 for measuring wear. The discs are made of carbon steel grade 1045, having an HRC of 27-30. Electrical motor or gear 190 supplies the torque for the rotation. Counter-plate 192 is made of a copper alloy (UNS C93700 (HRC=22-24)), ground to an average roughness (Ra) of 0.4 micrometers. Counter-plate 192 has a support 194, which has an adjustable height for controlling the force applied on disc 186.

The control discs have a conventional grinding finish (Ra=0.4 micrometers), whereas the test discs undergo further treatment by micro-grooving face 196 of the disc, and then by lapping, in accordance with the present invention. During the experiments, a permanent load of a 100 N is applied to the disc in the direction of the counter plate 192. One drop of Amoco Industrial Oil 32 (equivalent to ASTM 150 Turbine Oil) is applied to the dry friction surface before activating the motor to achieve a constant rotation rate of 250 rpm. The time to seizure, which is the accumulated time from stat of turning, until the time in which movement was stopped by seizure, was measured.

After 16-18 minutes, all control discs underwent seizure. By sharp contrast, the disc that was treated by micro-grooving and lapping, according to the present invention, continued to revolve without stopping, for a period above 40 hours, at which point the experiment was curtailed. Seizure of the treated disc did not occur.

In another experiment, the disc was rotated at 180 rpm. A group of control discs was subjected to finishing by grinding. A second group of discs was subjected to micro-grooving. A third group of discs was subjected to micro-grooving and to lapping, according to the present invention. The results of a one-drop test are provided in Table 2. The path of the disc until seizure, the coefficient of friction, and the intensity of wear (measured by peak depression formed on the counter-plate as a result of the friction with the disc) were calculated.

TABLE 2

Results of Discs Rolling Against a Counter-Plate

| Surface treatment of disc | Calculated path until seizure (in Km) | Coefficient or friction | intensity of wear (in mm³/Km) |
|---|---|---|---|
| Grinding | 1.5 | 0.1-0.2 | 0.2 |
| Grinding + micro-grooving | 8.7 | 0.08-0.12 | 0.02 |
| Grindng + micro-grooving + lapping | At least 29.7 | 0.03-0.04 | 0.001 |

The inventive working surface of the present invention, incorporated in various mechanical elements that engaged in frictional forces, reduces friction and wear, risk of seizure, and prolongs the operating life of such elements. In punching applications, the qualities of the working surface are improved, and a power reduction of up to 30% is observed.

In internal combustion engines, the inventive working surface, and the inventive system for production thereof were applied to 120 mm cylinder sleeves of diesel engines and to 108 mm diameter motorcycle engines. The results of the tests demonstrate that for a given performance level, the use of sleeves having the inventive work surfaces, as compared with conventional sleeves, reduces fuel consumption. In addition, the sleeves having the inventive working surfaces have a characteristically longer lifetime, and lose less oil.

As used herein in the specification and in the claims section that follows, the term "liquid attracting zone" refers to a zone within a working surface in which the characteristic dimensionless wetting coefficient is greater than 0.95, and typically greater than 0.98, 60 minutes after the initial dispersion of oil on to the working surface.

As used herein in the specification and in the claims section that follows, the term "characteristic dimensionless wetting coefficient" is defined by:

$$\frac{A(t)}{A_0}$$

wherein $A(t)$ is the nominal wetted area of the working surface as a function of time, and $A_0$ is the nominal surface area of the working surface, and wherein the liquid used for determining $A(t)$ is No. 22 industrial oil.

As used herein in the specification and in the claims section that follows, the term "No. 22 industrial oil", "C22 industrial oil", and the like refers to a standard industrial oil for mechanical applications, having a viscosity of ~22 centistokes at 40° C.

As used herein in the specification and in the claims section that follows, the term "nominal surface area" with regard to a working surface, refers to a surface area of the surface based on the global geometric dimensions, without regard to microstructure. Hence, a square. 4 cm×4 cm working surface has a nominal surface area of 16 cm².

Example 2

Figure 19:
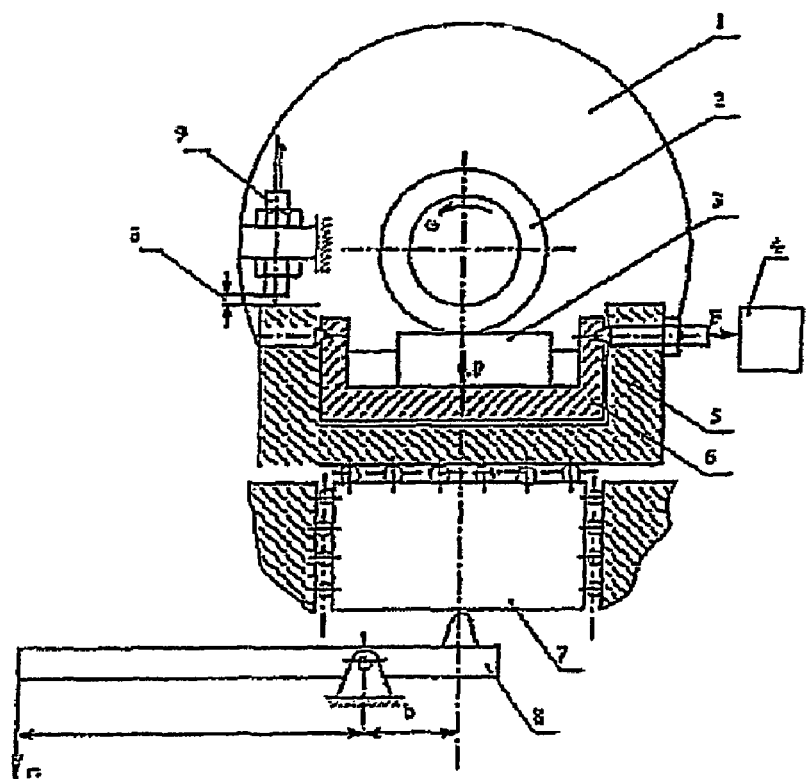
FIG. 19 is a schematic illustration of a test rig for evaluating the tribological properties of rollers processed according to the present invention, in a "one drop" test.

A roller on block tribo-tester was used to evaluate the tribological properties of rollers processed according to the present invention, in a "one drop test". The test rig is described schematically in FIG. 19. A rotating roller 2 is brought into contact with a stationary block 3 under a given load P while a very small amount of lubricant (one drop) is applied to the contact. A force transducer 4 is used to measure the frictional force F and a proximity probe 9 measures the variation in the gap, thus providing the total wear of roller 2 and block 3. Both friction and wear are continuously monitored and recorded as functions of time. The test is stopped at the occurrence of any one of the following three events: (a) the friction coefficient=F/P reaches a value of 0.3; (b) seizure starts between the roller and the block (characterized by a sudden, sharp increase in friction and corresponding increase in noise level), or (c) the friction reaches a maximum value and starts decreasing. The test duration is defined as the time elapsed from the start of the test until the end of the test due to the occurrence of events (a) or (b) described above, or the time corresponding to the maximum friction in case of event (c). It should be noted that in this special case (c), the test is continued for about 20 minutes beyond the "test duration" prior to complete stop. For each new test, block 3 is moved horizontally in its holder 6 to provide a fresh contact.

Tests were performed on each of 6 steel roller specimens, using a bronze block as the counter-surface. Roller #1 and roller #6 are reference rollers, as described in Table 3 hereinbelow. Rollers #2-5 were processed with combined microrelief, according to the present invention, with various groove patterns and groove areas. SAE 40 oil at room temperature was used as the lubricant. One drop of oil was placed on roller 2, which is then brought into light contact (18 N load) with bronze block 3 and turned (manually) two revolutions to spread the oil over the entire circumference. The amount of excess oil transferred to the block was wiped off with a clean paper towel, leaving only the roller lubricated. The load was increased to a level of P=150 N, and the test was started with a roller speed of 105±5 rpm.

Figure 20:
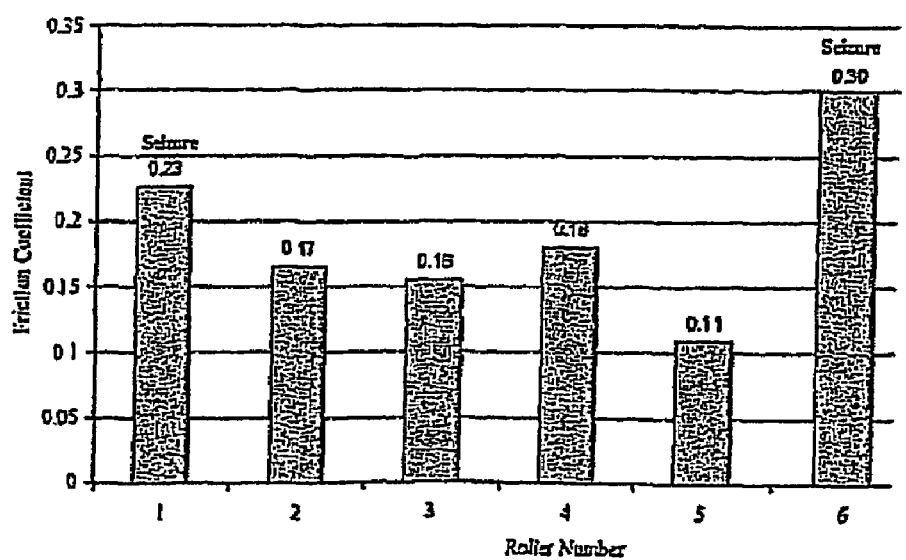
FIG. 20 shows the friction coefficient at the stop point of the test, for each roller, and FIG. 21 provides plots of the friction coefficient ($\mu$) and wear (h) as a function of friction length (L).

Table 2 presents the test duration, in minutes, of each roller, and indicates the type of event that caused the stop of the test. FIG. 20 shows the friction coefficient at the stop point of the test for each roller.

Reference roller #1 seized after a very short time of 6 minutes at a friction coefficient=0.23. Roller #6 exhibited a continuously increasing friction, and the test was stopped after 21 minutes, at a friction coefficient=0.3 and seizure inception. All rollers processed in accordance with the present invention (rollers #2 to #5) showed an increased friction up to a certain maximum value, followed by a decrease in the friction. The maximum friction coefficient in these 4 rollers wag no more than 0.18. Roller #5 had a friction coefficient of 0.11, which was the lowest friction coefficient of the six rollers.

Figure 21:
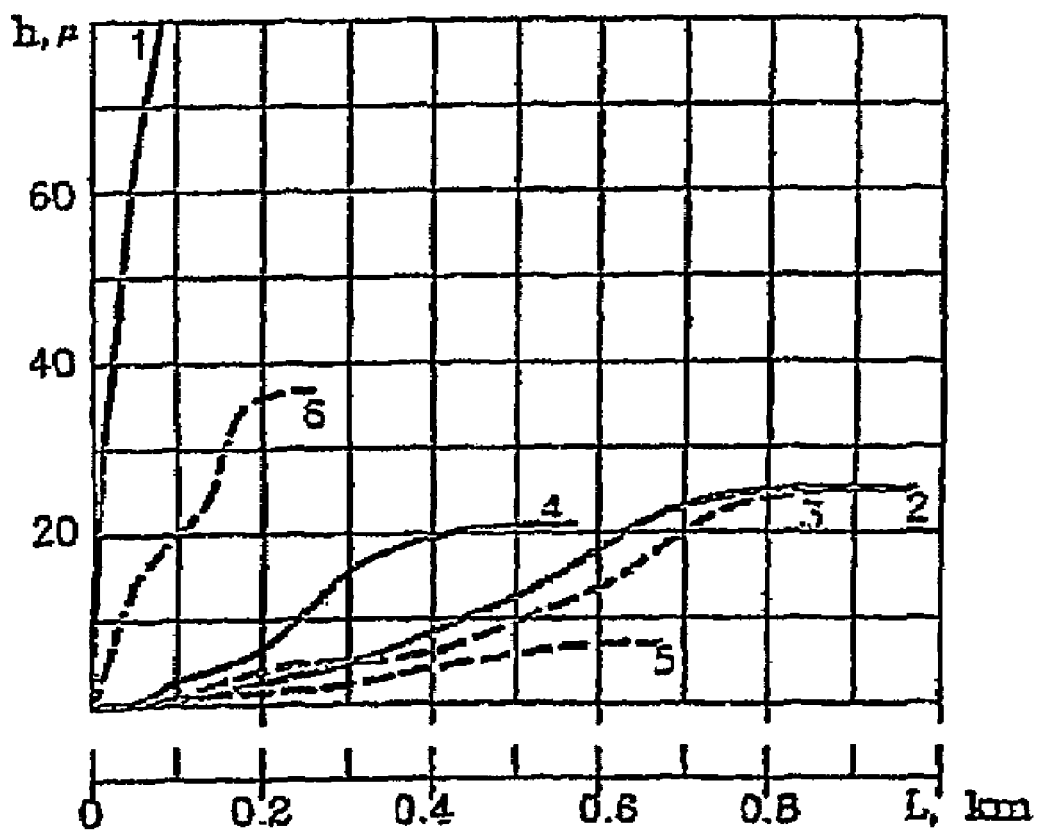

A graph of the friction coefficient (μ) and wear (h) as a function of friction length (L) is provided in FIG. 21.

TABLE 3

| | Roller # | | | | | |
|---|---|---|---|---|---|---|
| | 1 (reference) | 2 | 3 | 4 | 5 | 6 (reference) |
| Roller Material | SAE 4340 steel | SAE 4340 steel | SAE 4340 steel | SAE 4340 steel | SAE 4340 steel | SAE 4340 steel |
| Roller Prep. | ground surface | inventive CMR | inventive CMR | inventive CMR | inventive CMR | regular microrelief without bulges |
| Heat Treatment | Ra ≈ 0.2μ HRC 52-54 | Ra ≈ 0.2μ HRC 52-54 | Ra ≈ 0.2μ HRC 52-54 | Ra ≈ 0.2μ HRC 52-54 | Ra ≈ 0.2μ HRC 52-54 | Ra ≈ 0.2μ HRC 52-54 |
| Test duration (min) | 6 | 52 | 53 | 25 | 37 | 21 |
| Stop event | B | C | C | C | C | A&B |

Example 3

A roller on block tribo-tester was used to evaluate the tribological properties of rollers in a "one drop test". Sliding distance tests were performed on each of four hardened-steel roller specimens, using a hardened-steel block as the counter-surface.

Roller specimen I was prepared using a conventional lapping method;

roller specimen II was prepared using a lapping method of the present invention;

roller specimen III was prepared by grooving followed by the conventional lapping method used in preparing roller specimen I, and roller specimen IV was prepared by grooving followed by the inventive lapping method used in preparing roller specimen II.

The results of the sliding tests are presented in Table 4. Roller specimen II, prepared using a lapping method of the present invention, achieved a sliding distance of 1373 meters, nearly double that of reference roller specimen I, which was prepared using a conventional lapping method. Surprisingly, roller specimen IV, prepared by grooving followed by the inventive lapping method used in preparing roller specimen II, achieved a sliding distance of 9060 meters, more than a fourfold increase in sliding distance with respect to that of reference roller specimen III, which was prepared by grooving followed by using the conventional lapping method used in preparing roller specimen I. Thus, while the inventive lapping method performs well with respect to the conventional lapping method, the combination of the inventive lapping method while standard grooving methods achieves a surprisingly-high performance with respect to prior-art methods of grooving and lapping.

TABLE 4

| Specimen | Sliding Distance (meters) |
|---|---|
| roller specimen I | 709 |
| roller specimen II | 1373 |
| roller specimen III | 2061 |
| roller specimen IV | 9060 |

As used herein in the specification and in the claims section that follows, the term "impact resistance" refers to the impact resistance, with notch, in units of $kJ/m^2$, as determined by ASTM STANDARD D 256-97.

As used herein in the specification and in the claims section that follows, the term "Shore D hardness", and the like, refers to a measure of the resistance of material to indentation according to the standard ASTM test (D 2240-97).

The hardness testing of plastics and had rubbers is most commonly measured by the Shore D test, with higher numbers signifying greater resistance.

As used herein in the specification and in the claims section that follows, the term "freely disposed", regarding abrasive particles, relates to the free-flowing state of abrasive particles as in typical lapping methods of the prior art.

As used herein in the specification and in the claims section that follows, the term "intimately bonded", with respect to a film and a working surface, refers to a nanometric, adhesive film having a contour that complements the micro-contour of the working surface, such that the film is firmly attached to the working surface along the entire contour thereof.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications mentioned in this specification are herein incorporated in their entirety by reference into the specification, to the same extent as if each individual publication was specifically and individually indicated to be incorporated herein by reference.

What is claimed is:

1. A mechanical system for lapping a metal load-bearing surface to produce a tribological surface, the system comprising:
   (a) a metal workpiece having the metal load-bearing surface;
   (b) a lapping tool having a contact surface, said contact surface disposed generally opposite the working surface, said contact surface including an organic, polymeric material;
   (c) a plurality of abrasive particles, said abrasive particles freely disposed between said contact surface and the working surface, and
   (d) a mechanism, associated with at least one of the working surface and said contact surface, adapted to apply a relative motion between said contact surface and the metal working surface, and to exert a load on said contact surface and the working surface,
   said contact surface having a Shore D hardness within a range of 40-90,
   said contact surface adapted to provide an at least partially elastic interaction with said plurality of abrasive particles,
   and wherein said contact surface and said mechanism are designed and configured, and said plurality of particles is selected, wherein upon activation of said mechanism, said relative motion under said load effects lapping of the metal working surface, by said abrasive particles, to produce the tribological surface.

2. The mechanical system of claim 1, wherein said contact surface has a Shore D hardness within a range of 60-90.

3. The mechanical system of claim 1, wherein said Shore D hardness is within a range of 65-90.

4. The mechanical system of claim 3, wherein an impact resistance of said contact surface is within a range of 4-20 $kJ/m^2$.

5. The mechanical system of claim 4, wherein said Shore D hardness is within a range of 68-82.

6. The mechanical system of claim 4, wherein said impact resistance is within a range of 5-8 $kJ/m_2$.

7. The mechanical system of claim 2, wherein said polymeric material includes an epoxy material.

8. The mechanical system of claim 2, wherein said polymeric material includes a polyurethane.

9. The mechanical system of claim 8, wherein said polymeric material includes an epoxy material.

10. The mechanical system of claim 9, wherein a composition of said epoxy material and said polyurethane has a weight ratio of 25:75 to 90:10.

11. The mechanical system of claim 1, wherein a composition of said contact surface includes a polyurethane in a range of 3% to 75%, by weight.

12. The mechanical system of claim 1, wherein the metal working surface is a steel working surface.

13. The mechanical system of claim 1, wherein the metal working surface has a Rockwell C hardness of at least 20.

14. The mechanical system of claim 1, wherein the metal working surface has a Rockwell C hardness of at least 50.

15. The mechanical system of claim 1, further comprising an abrasive paste including said abrasive particles.

16. A mechanical system for lapping a metal load-bearing surface to produce a tribological surface, the system comprising:
   (a) a metal workpiece having the metal load-bearing surface;
   (b) a lapping tool having a contact surface, said contact surface disposed generally opposite the working surface, said contact surface including an organic, polymeric material;
   (c) an abrasive paste including a plurality of abrasive particles, said abrasive particles freely disposed between said contact surface and the working surface, and
   (d) a mechanism, associated with at least one of the working surface and said contact surface, adapted to apply a relative motion between said contact surface and the metal working surface, and to exert a load on said contact surface and the working surface,
   said contact surface adapted to provide an at least partially elastic interaction with said plurality of abrasive particles,
   and wherein said contact surface and said mechanism are designed and configured, and said plurality of particles is selected, wherein upon activation of said mechanism, said relative motion under said load effects lapping of the metal working surface, by said abrasive particles, to produce the tribological surface.

17. A mechanical system for lapping a metal load-bearing surface to produce a tribological surface, the system comprising:
   (a) a metal workpiece having the metal load-bearing surface;
   (b) a lapping tool having a contact surface, said contact surface disposed generally opposite the working surface, said contact surface including an organic, polymeric material;
   (c) a plurality of abrasive particles, said abrasive particles freely disposed between said contact surface and the working surface, and
   (d) a mechanism, associated with at least one of the working surface and said contact surface, adapted to apply a relative motion between said contact surface and the metal working surface, and to exert a load on said contact surface and the working surface, said contact surface adapted to provide an at least partially elastic interaction with said plurality of abrasive particles, and wherein said contact surface and said mechanism are designed and configured, and said plurality of particles is selected, wherein upon activation of said mechanism, said relative motion under said load effects lapping of the metal working surface, by said abrasive particles, to produce the tribological surface, and wherein said contact surface has a Shore D hardness within a range of 60-90.

18. A mechanical system for lapping a metal load-bearing surface to produce a tribological surface, the system comprising:

(a) a metal workpiece having the metal load-bearing surface;

(b) a lapping tool having a contact surface, said contact surface disposed generally opposite the working surface, said contact surface including an organic, polymeric material;

(c) a plurality of abrasive particles, said abrasive particles freely disposed between said contact surface and the working surface, and (d) a mechanism, associated with at least one of the working surface and said contact surface, adapted to apply a relative motion between said contact surface and the metal working surface, and to exert a load on said contact surface and the working surface, said contact surface adapted to provide an at least partially elastic interaction with said plurality of abrasive particles, wherein said contact surface and said mechanism are designed and configured, and said plurality of particles is selected, wherein upon activation of said mechanism, said relative motion under said load effects lapping of the metal working surface, by said abrasive particles, to produce the tribological surface, wherein the metal working surface is a steel working surface, and wherein said contact surface has a Shore D hardness within a range of 60-90.

19. The mechanical system of claim 18, wherein the working surface has a Rockwell C hardness of at least 50.

20. A mechanical system for lapping a metal load-bearing surface to produce a tribological surface, the system comprising:

(a) a metal workpiece having the metal load-bearing surface;

(b) a lapping tool having a contact surface, said contact surface disposed generally opposite the working surface, said contact surface including an organic, polymeric material;

(c) an abrasive paste including a plurality of abrasive particles, said abrasive particles freely disposed between said contact surface and the working surface, and (d) a mechanism, associated with at least one of the working surface and said contact surface, adapted to apply a relative motion between said contact surface and the metal working surface, and to exert a load on said contact surface and the working surface, said contact surface adapted to provide an at least partially elastic interaction with said plurality of abrasive particles, wherein said contact surface and said mechanism are designed and configured, and said plurality of particles is selected, wherein upon activation of said mechanism, said relative motion under said load effects lapping of the metal working surface, by said abrasive particles, to produce the tribological surface, wherein the metal working surface is a steel working surface, said polymeric material includes a polyurethane, said contact surface has a Shore D hardness within a range of 65-90, said contact surface has an impact resistance within a range of 4-20 kJ/m$^2$.

21. The mechanical system of claim 20, wherein said polymeric material further includes an epoxy material, and wherein a composition of said epoxy material and said polyurethane has a ratio of 25:75 to 90:10 of said epoxy material to said polyurethane, by weight.

22. The mechanical system of claim 20, wherein said Shore D hardness is within a range of 68-82.

23. The mechanical system of claim 20, wherein said impact resistance is within a range of 5-8 kJ/m$^2$.

24. The mechanical system of claim 21, wherein said Shore D hardness is within a range of 68-82.

* * * * *

UNITED STATES PATENT AND TRADEMARK OFFICE
CERTIFICATE OF CORRECTION

PATENT NO. : 7,578,728 B2  Page 1 of 1
APPLICATION NO. : 11/538443
DATED : August 25, 2009
INVENTOR(S) : Boris Shamshidov and Alexander Ignatovsky It is certified that error appears in the above-identified patent and that said Letters Patent is hereby corrected as shown below:

On the Title Page
Item (12) should be corrected as follows:
change
--Shamishidov et al.--
to
"Shamshidov et al."

Inventors Item (75) should be corrected as follows:
change
--Boris Shamishidov--
to
"Boris Shamshidov"

Signed and Sealed this

Fourteenth Day of December, 2010

David J. Kappos
*Director of the United States Patent and Trademark Office*